United States Patent
Suzuki

(10) Patent No.: US 7,478,098 B2
(45) Date of Patent: Jan. 13, 2009

(54) DATA TRANSFER SYSTEM AND COMPUTER-READABLE RECORDING MEDIUM RECORDING A DATA TRANSFER SERVER PROGRAM

(75) Inventor: Hidetoshi Suzuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 11/386,426

(22) Filed: Mar. 22, 2006

(65) Prior Publication Data
US 2006/0184545 A1    Aug. 17, 2006

Related U.S. Application Data

(63) Continuation-in-part of application No. 11/123,954, filed on May 6, 2005, now abandoned.

(30) Foreign Application Priority Data
Jan. 28, 2005    (JP) .............................. 2005-020557
Jan. 27, 2006    (JP) .............................. 2006-019129

(51) Int. Cl.
*G06F 17/30*    (2006.01)
(52) U.S. Cl. .................................. 707/10; 707/1; 707/3
(58) Field of Classification Search ..................... 707/1, 707/3; 345/419; 709/203
See application file for complete search history.

(56) References Cited

U.S. PATENT DOCUMENTS 5,761,328 A * 6/1998 Solberg et al. ............... 715/209
6,429,862 B1 * 8/2002 Teramoto ..................... 345/419
2003/0145023 A1 * 7/2003 Bennett et al. ............... 707/205
2003/0234790 A1 * 12/2003 Hochmuth et al. .......... 345/545
2006/0149810 A1 * 7/2006 Koo et al. ..................... 709/203

FOREIGN PATENT DOCUMENTS

| JP | 9-251414 | 9/1997 |
|----|----------|--------|
| JP | 2003-281023 | 10/2003 |
| WO | WO 97/30539 | 8/1997 |

* cited by examiner

Primary Examiner—Etienne P LeRoux
Assistant Examiner—Thuy (Tiffany) Bui
(74) Attorney, Agent, or Firm—Greer, Burns & Crain, Ltd.

(57) ABSTRACT

A data transfer system capable of lightening the load on a server and reducing the amount of data carried over a network. A search/registration unit of the server determines whether or not shape data in graphics information created by a three-dimensional application is registered in shape cache information and, if not registered, registers the shape data. If the shape data is registered, a data transfer unit replaces the shape data with designation information specifying the corresponding data in the shape cache information to generate graphics differential information, and transmits the generated information to a client. A registration unit of the client registers new shape data in shape cache information in accordance with the graphics differential information. A data restoration unit searches the shape cache information based on the designation information to extract the corresponding shape data, and replaces the designation information with the shape data to restore the graphics information.

14 Claims, 24 Drawing Sheets

PATTERN A

721 CLIENT-SIDE PATTERN A COORDINATE GROUP

|  | x | y | z |
|---|---|---|---|
| COORDI-NATES 1 | 20.5 | 15.5 | 30.0 |
| COORDI-NATES 2 | 25.5 | 15.5 | 31.0 |
| COORDI-NATES 3 | 25.5 | 10.1 | 32.0 |

FIG. 16A

PATTERN B

731 CLIENT-SIDE PATTERN B COORDINATE GROUP

|  | x | y | z |
|---|---|---|---|
| COORDI-NATES 1 | 35.1 | 20.2 | 15.6 |
| COORDI-NATES 2 | 35.1 | 20.2 | 15.6 |
| COORDI-NATES 3 | 35.1 | 20.2 | 15.6 |

FIG. 16B

DATA TRANSFER SYSTEM AND COMPUTER-READABLE RECORDING MEDIUM RECORDING A DATA TRANSFER SERVER PROGRAM

CROSS-REFERENCE TO RELATED APPLICATIONS

This application is a continuation-in-part of Ser. No. 11/123,954 filed on May 6, 2005 now abandoned.

BACKGROUND OF THE INVENTION

1. Field of the Invention

The present invention relates to data transfer systems and computer-readable recording media recording data transfer server programs, and more particularly, to a data transfer system and a computer-readable recording medium recording a data transfer server program whereby graphics information created by an application of a server can be transferred to a client connected to the server via a network.

2. Description of the Related Art

RDP (Remote Desktop Protocol) adopted in Windows (registered trademark) is known as one of conventional techniques permitting the results of processing by a server to be displayed at a remote client.

In RDP, the server holds screen images to be displayed at the client, and information to be displayed at the client is transmitted as differential information of image data. Based on the received differential information, the client refreshes the currently displayed screen. Namely, generation of image data is in its entirety taken care of by the server. According to RDP, three-dimensional shape data as image data is handled in like manner. Specifically, the server holds screen images and transmits differential information of image data to the client.

Apart from RDP in which differential information of image data is transmitted, there has also been known a method of directly transmitting graphic commands to generate image data. Graphic commands are, however, larger in data amount than image data, and therefore, especially in the case where the method is used to handle three-dimensional images, a problem arises in that a large amount of data needs to be transferred, compared with the case of transmitting image data. As a solution to the problem, OpenGL (Graphics Library), which is a three-dimensional graphics library standard, provides a scheme called display list.

With this scheme, a series of repeatedly used graphic commands is defined in advance and transmitted only once from the server to the client. The client stores the received display list. When the display list is specified thereafter from the server, the client can draw images by itself. Thus, the scheme is effective in the case of redrawing a single shape a number of times (as in the case of viewing a three-dimensional shape from different directions).

To lighten the load on the network, there has also been proposed a network communication system wherein both of the server and the client are provided with a relay cache, and data transmitted from the server to the client is stored in each of the relay caches so that if data requested by a client application exists in the relay cache of the client, the client can use the data stored in its own relay cache (see Unexamined Japanese Patent Publication No. H09-251414 (paragraph nos. [0021] to [0039], FIG. 1), for example).

Meanwhile, in the case of using a form called ASP (Application Service Provider) where applications are collectively managed by a server, existing stand-alone applications, if compatible with ASP, can be directly run in the form of ASP without the need for any modification. In fact, many of business applications can be run in the form of ASP by using RDP. However, in cases where an application handling three-dimensional shapes is run in the form of ASP by using the conventional techniques, the operation of ASP loses practicality because of the problem of performance.

First, with RDP in which the server takes charge of all image processing, the load on the CPU (Central Processing Unit) of the server increases. Drawing a three-dimensional shape involves numerous logical operations. Thus, where an application is run as a stand-alone application, a dedicated graphics accelerator is often prepared for hardware rendering, in order to achieve high-speed processing. However, the server is required to simultaneously run applications for multiple clients, and also drawing of screen images to be held by the server needs to be executed in parallel; therefore, an ordinary graphics accelerator, which is basically adapted to process screen images one by one, cannot be used. Consequently, all three-dimensional shapes are rendered by software by means of the CPU, and also since drawing operations for multiple applications need to be executed in parallel, the CPU of the server is applied with an extremely heavy load. The heavier the load on the server CPU, the slower the overall server process becomes, with the result that the operation of ASP loses practicality because of lowering in performance.

On the other hand, the method of transmitting graphic commands from the server is associated with a problem that a vast amount of data needs to be transferred. The OpenGL display list does not work unless a display list process is incorporated in the application program. However, a large majority of existing applications are not intended for ASP and are incapable of effectively using display lists. Thus, where an application using no display list is run, a vast amount of data is transferred from the server to the client. For this reason, practical operation of ASP is unavailable due to the problem of performance.

As explained above, in the case of a client-server system adapted to process three-dimensional shapes which entail a heavy processing load and require transfer of a vast amount of data, it is difficult to run existing applications handling three-dimensional shapes in the form of ASP without the need for modification of the applications.

SUMMARY OF THE INVENTION

The present invention was created in view of the above circumstances, and an object thereof is to provide a data transfer system capable of lightening the load on a server and also reducing the amount of data carried over a network, and a computer-readable recording medium recording a data transfer server program for the system.

To achieve the object, there is provided a data transfer system for transferring graphics information created by an application of a server to a client connected to the server via a network. The data transfer system comprises an application server and a client. The application server includes a server-side cache for storing shape cache information in which is registered shape data used for drawing a predetermined shape, a search/registration unit, responsive to creation of graphics information by the application, for searching the server-side cache to determine whether or not shape data of the created graphics information is registered in the shape cache information, and registering the shape data in the shape cache information in the server-side cache if the shape data is not registered, and a data transfer unit for replacing, if the shape data is registered, the shape data of the graphics information with designation information specifying corresponding registered shape data registered in the shape cache information to generate graphics differential information, and transmitting the generated graphics differential information to the client. The client includes a client-side cache for storing the shape cache information in which the shape data is registered, a registration unit, responsive to acquisition of the graphics differential information from the application server, for registering new shape data of the graphics differential information in the shape cache information in the client-side cache, and a data restoration unit for searching the shape cache information in the client-side cache based on the designation information of the graphics differential information, and replacing the designation information of the graphics differential information with registered shape data found by the search, to restore the graphics information.

Also, to achieve the above object, there is provided a computer-readable recording medium recording a data transfer server program for transferring graphics information created by an application to a client over a network. The data transfer server program causes a computer to execute the step of causing a search/registration unit to perform a search in response to creation of graphics information by the application to determine whether or not shape data of the created graphics information used for drawing a predetermined shape is registered in shape cache information stored in a server-side cache, and register the shape data in the shape cache information in the server-side cache if the shape data is not registered; and the step of causing a data transfer unit to replace, if the shape data is registered, the shape data of the graphics information with designation information specifying corresponding registered shape data registered in the shape cache information to generate graphics differential information, and transmit the generated graphics differential information to the client which is adapted to store the shape cache information in a client-side cache, search the client-side cache based on the designation information of the graphics differential information, and replace the designation information with registered shape data found by the search, to restore the graphics information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 16A and 16B exemplify a client-side coordinate approximation process according to the second embodiment, wherein FIG. 16A shows a client-side coordinate group of pattern A shown in FIG. 14, and FIG. 16B shows a client-side coordinate group of pattern B shown in FIG. 15.

DESCRIPTION OF THE PREFERRED EMBODIMENTS

Preferred embodiments of the present invention will be described below with reference to the accompanying drawings. First, the concept of the invention applied to the embodiments will be explained, and then specific embodiments will be described in detail.

Figure 1:
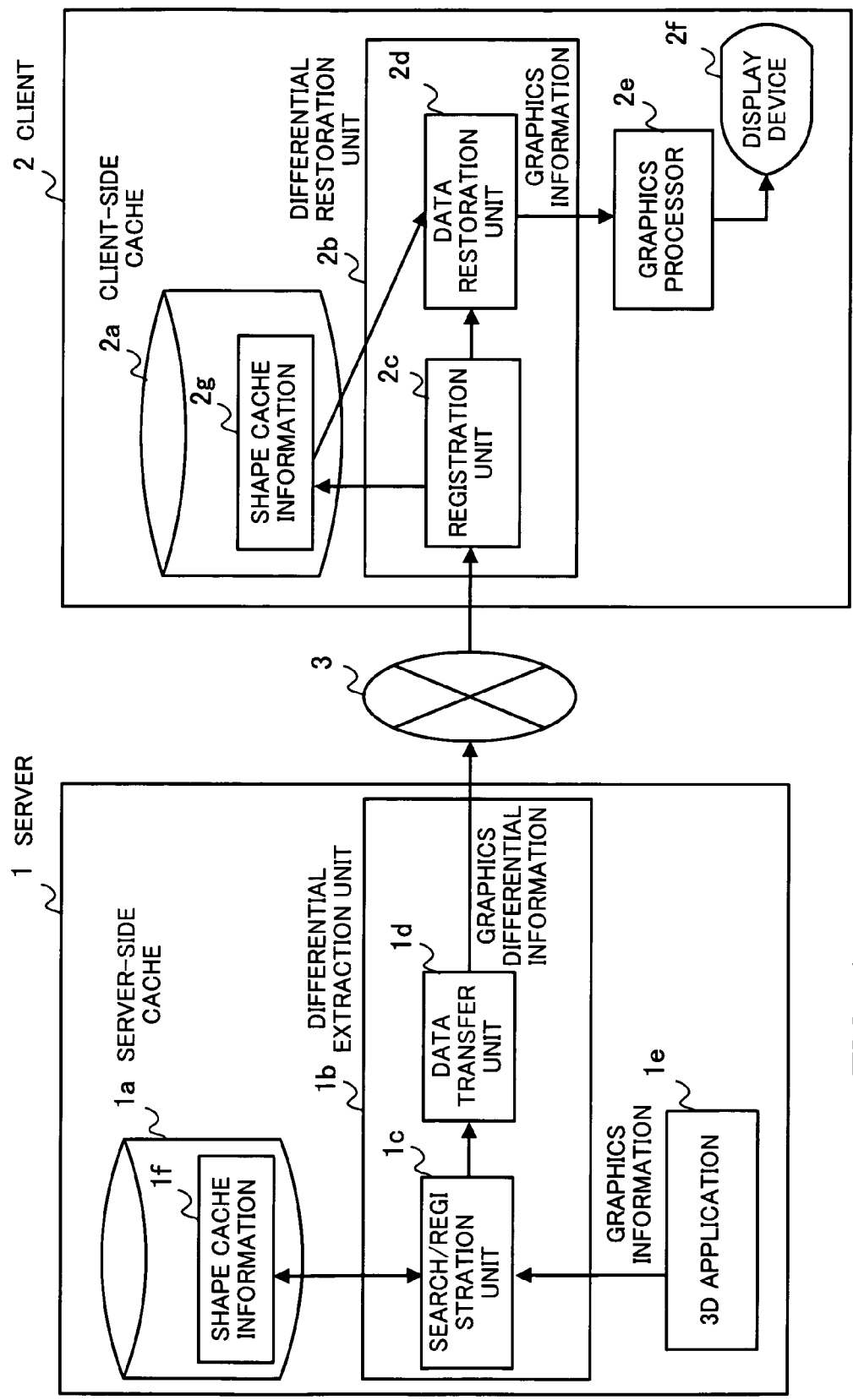
FIG. 1 is a conceptual diagram illustrating the invention applied to embodiments.

FIG. 1 is a conceptual diagram illustrating the invention applied to the embodiments.

A data transfer system according to the present invention is applied to a client-server system in which a server 1 and a client 2 are interconnected by a network 3 and the results of application processing by the server 1 are displayed at the client 2.

The server 1 includes a server-side cache 1a, a differential extraction unit 1b, and a three-dimensional (3D) application 1e. The differential extraction unit 1b has a search/registration unit 1c and a data transfer unit 1d.

The server-side cache 1a is a memory provided in the server 1 and storing shape cache information 1f in which is registered shape data created by the application. In the shape cache information 1f, a shape data section extracted from graphics information created by the 3D application 1e is registered together with a shape number uniquely assigned to the shape data.

When graphics information is created by the 3D application 1e, the search/registration unit 1c performs a search to determine whether or not the shape data in the graphics information is registered in the shape cache information 1f and, if the shape data is not registered, registers the shape data in the shape cache information 1f. Each shape data is registered, together with a shape number uniquely assigned thereto, in the shape cache information 1f. For example, a serial number beginning from "1" is assigned in order of registration in the shape cache information 1f. The shape data is also registered in the client 2 in like manner, as described in detail later, to create shape cache information 2g having the same contents as the shape cache information 1f.

The data transfer unit 1d transfers the graphics information created by the 3D application 1e to the client 2. At this time, data in the graphics information other than the shape data is directly set as transmit data. With respect to the shape data, the search/registration unit 1c performs a search to determine whether or not the shape data is registered in the shape cache information 1f, and if the shape data is registered, the shape data is replaced with designation information specifying the shape data registered in the shape cache information 1f. For example, the shape data in the graphics information is replaced by the shape number uniquely assigned to the corresponding registered shape data. Generally, shape data occupies a major part of graphics information, and in order for a predetermined shape to be drawn, a plurality of vertexes, normal lines, etc. are specified with respect to a single shape. Thus, by replacing the shape data in the graphics information with the designation information (shape number assigned to the corresponding registered shape data), it is possible to cut down the amount of data. If it is judged by the search/registration unit 1c that the shape data is not registered, the shape data is directly set as transmit data. In this manner, graphics differential information (differential information of the graphics information) is generated by replacing the shape data, which has once been transmitted to the client 2, with the designation information and is transmitted to the client 2 as transmit data.

If necessary, when coordinate data is to be transmitted from the server 1 to the client 2, the degree of accuracy required to draw the data on the display of the client 2 may be calculated in advance, and if it is judged that high coordinate accuracy is not required, some of the coordinates are replaced by approximate values, thereby reducing the amount of transmit data. If the need for high accuracy thereafter arises as a result of manipulation to display the shape in enlargement, for example, coordinate differential data for enhancing the coordinate accuracy is transmitted at this point of time.

The 3D application 1e performs application processing to generate graphics information necessary for drawing prescribed screen images.

The functions of the individual processing units of the aforementioned server 1 are performed when a data transfer server program is executed by the server computer.

On the other hand, the client 2 includes a client-side cache 2a, a differential restoration unit 2b, a graphics processor 2e, and a display device 2f. The differential restoration unit 2b has a registration unit 2c and a data restoration unit 2d.

The client-side cache 2a is a memory provided in the client 2 and storing the shape cache information 2g in which is registered the shape data created by the application.

On acquiring the graphics differential information, the registration unit 2c registers the shape data of the graphics differential information in the shape cache information 2g in the client-side cache 2a. At this time, the shape data is registered, together with a uniquely assigned shape number, in the shape cache information 2g, as performed in the search/registration unit 1c of the server 1. For example, a serial number beginning from "1" is assigned in order of registration. The shape data of the graphics differential information is also registered in the shape cache information 1f of the server 1; therefore, if the shape data is registered in the client in the same order as in the server 1, the same shape number as that in the shape cache information 1f of the server 1 can be assigned. Alternatively, the shape number may be specified by the server 1 so that the corresponding shape data may be registered together with the specified shape number. When the coordinate differential data is received from the server 1, corresponding coordinates in the shape cache information 2g are modified using the coordinate differential data, and the modified shape data is registered.

The data restoration unit 2d reads out the designation information from the graphics differential information, searches the shape cache information 2g in the client-side cache 2a on the basis of the designation information, and replaces the designation information with corresponding registered shape data found by the search. The server-side shape cache information 1f and the client-side shape cache information 2g hold identical items of shape data assigned with identical shape numbers, as mentioned above, and accordingly, original shape data can be restored by looking up the shape number specified by the designation information. All items of designation information are replaced by corresponding shape data to thereby restore the graphics information.

The graphics processor 2e processes the graphics information restored by the data restoration unit 2d. Where the graphics information includes graphic commands, the processor interprets the graphic commands to generate images, which are then displayed on the display device 2f.

The functions of the individual processing units of the aforementioned client 2 are performed when a data reception program is executed by the client computer.

Operation of the aforementioned data transfer system will be now explained.

In the server 1, graphics information to be transferred to the client 2 is hooked by the differential extraction unit 1b at the timing when the graphics information is created by the 3D application 1e. The search/registration unit 1c of the differential extraction unit 1b performs a search to determine whether or not the shape data in the created graphics information is registered in the shape cache information 1f and, if the shape data is not registered, registers the shape data in the shape cache information 1f with a shape number assigned thereto. If information about the coordinate accuracy is included as data other than the shape data, the shape data is registered inclusive of the accuracy information. The data transfer unit 1d replaces the shape data which is judged by the search/registration unit 1c to be registered in the shape cache information 1f, among those in the graphics information, with designation information specifying the corresponding shape data registered in the shape cache information 1f. Where no such replacement is performed, the accuracy required to draw data at the client side may be determined as needed so that some coordinates may be approximated in accordance with the determination result, thereby reducing the amount of transmit data. If the need for higher accuracy thereafter arises, the coordinate differential data for enhancing the coordinate accuracy is transmitted together with designation information specifying the replaced data. In this manner, data other than the shape data as well as shape data not registered in the shape cache information 1f are retained as they are while the registered shape data is replaced by designation information to generate graphics differential information, which is then transmitted to the client 2.

On acquiring the graphics differential information, the differential restoration unit 2b of the client 2 restores the graphics information on the basis of the graphics differential information, and sends the restored information to the graphics processor 2e. Specifically, the registration unit 2c registers the shape data of the graphics differential information in the shape cache information 2g together with the same shape number as assigned by the server 1. When the coordinate differential data for enhancing the coordinate accuracy is received, the corresponding coordinates of the registered shape data are modified using the coordinate differential data. The data restoration unit 2d searches the shape cache information 2g on the basis of the designation information in the graphics differential information, and replaces the designation information with the corresponding registered shape data found by the search. The graphics information created by the 3D application 1e of the server 1 is restored in this manner. The restored information is processed by the graphics processor 2e and the screen images contained therein are displayed on the display device 2f.

Thus, not the whole graphics information but the graphics differential information is transferred, whereby the data transfer amount can be reduced. Especially, a 3D application is often manipulated so as to slightly shift the viewpoint at a time, and in such a case, most shape data remains unchanged before and after the shift of the viewpoint. Shape data is large in size, and therefore, by replacing unchanging shape data by designation information specifying only the corresponding shape number, it is possible to drastically cut down the data transfer amount. Also, by setting transmit data taking account of the accuracy of coordinates of the shape data, it is possible to reduce the data amount as well as to shorten the waiting time needed at the initial display stage.

In order to cause the client to register the shape data in the shape cache information without fail and also to make the shape numbers of the client agree with those of the server, a cache registration command and a shape number may be added to the transmit data on the server side. In this case, in accordance with the command, the client registers the shape data with the specified shape number assigned thereto.

Embodiments of the present invention will be now described in detail with reference to the accompanying drawings wherein the invention is applied to a 3D application system using OpenGL, by way of example.

Figure 2:
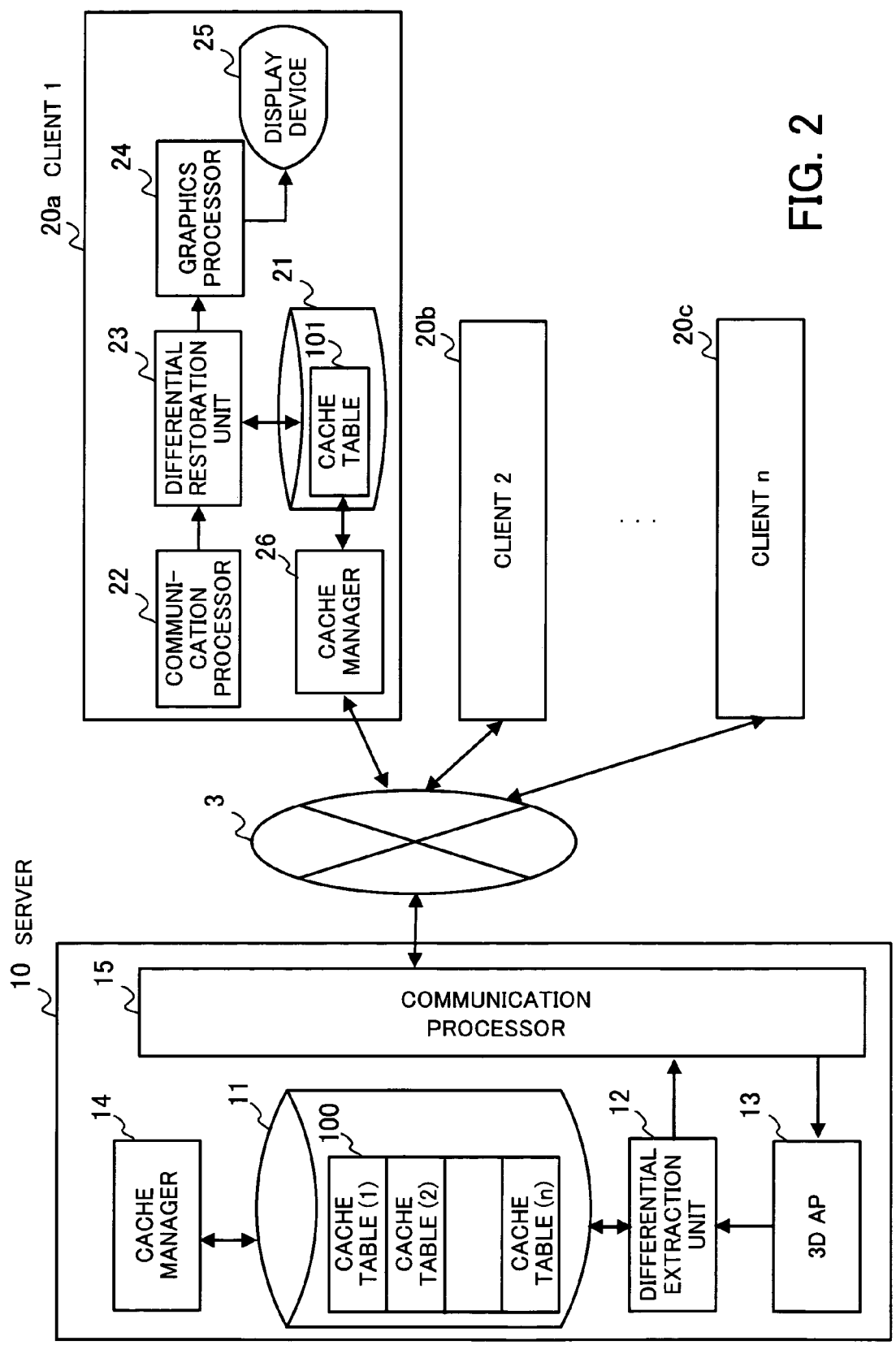
FIG. 2 illustrates the configuration of a three-dimensional application system according to a first embodiment.

FIG. 2 shows the configuration of a 3D application system according to a first embodiment.

In the 3D application system of the first embodiment, a 3D application of a server 10 is started in response to a request from any of a client 1 (20a), client 2 (20b), . . . , client n (20c) connected to the server via a network 3, where n is a desired integer number.

The server 10 includes a cache 11, a differential extraction unit 12, a 3D application (hereinafter 3D AP) 13, a cache manager 14, and a communication processor 15.

The cache 11 is a memory for storing the shape cache information 1f. A cache table 100 stored in the cache is an aggregate of cache tables (shape cache information storage areas) associated with the respective clients. In FIG. 2, the cache table (1) is associated with the client 1, the cache table (2) with the client 2, and the cache table (n) with the client n. The differential extraction unit 12 includes a search/registration unit for registering cache tables for the respective clients in accordance with the graphics information created by the 3D AP, and a data transfer unit for creating and transmitting graphics differential information. The 3D AP 13 is executed in response to a start request from a client and creates, as the graphics information, groups of graphic commands for drawing images of three-dimensional shapes. The cache manager 14 manages the cache 11. If the data size of the cache table 100 becomes greater than a predetermined size because of an increase in the number of items of shape data registered in the individual cache tables, the cache manager 14 deletes the registered shape data. The management of the cache table 100 will be described in detail later. The communication processor 15 controls communications with the respective clients connected via the network 3.

The client 1 (20a), the client 2 (20b), . . . , the client n (20c) are configured in the same manner, and therefore, the client 1 (20a) alone will be described below.

The client 1 (20a) includes a cache 21, a communication processor 22, a differential restoration unit 23, a graphics processor 24, a display device 25, and a cache manager 26.

The cache 21 is a memory storing the shape cache information 2g. Specifically, the cache 21 stores the data of the cache table associated with the client 1, among the data stored in the cache table 100 of the server 10. The communication processor 22 controls the communication with the server 10 via the network 3. The differential restoration unit 23 includes a registration unit for registering shape data in accordance with the graphics differential information received from the server 10, and a data restoration unit for restoring the graphics information. The graphics processor 24 interprets the graphic commands included in the graphics information and displays images on the screen of the display device 25. The cache manager 26 carries out cache management in the same manner as performed by the cache manager 14 of the server 10. Specifically, if the data size of the cache table becomes greater than a predetermined size because of an increase in the number of items of shape data registered in the cache table, the cache manager deletes the registered shape data.

The processing function of the aforementioned server 10 is performed when the data transfer server program is executed by the server computer, and the processing functions of the client 1 (20a), client 2 (20b), . . . , client n (20c) are performed when the data reception program is executed by the respective client computers. In the following, the clients are collectively referred to as client 20 where no particular client needs to be specified.

Figure 3:
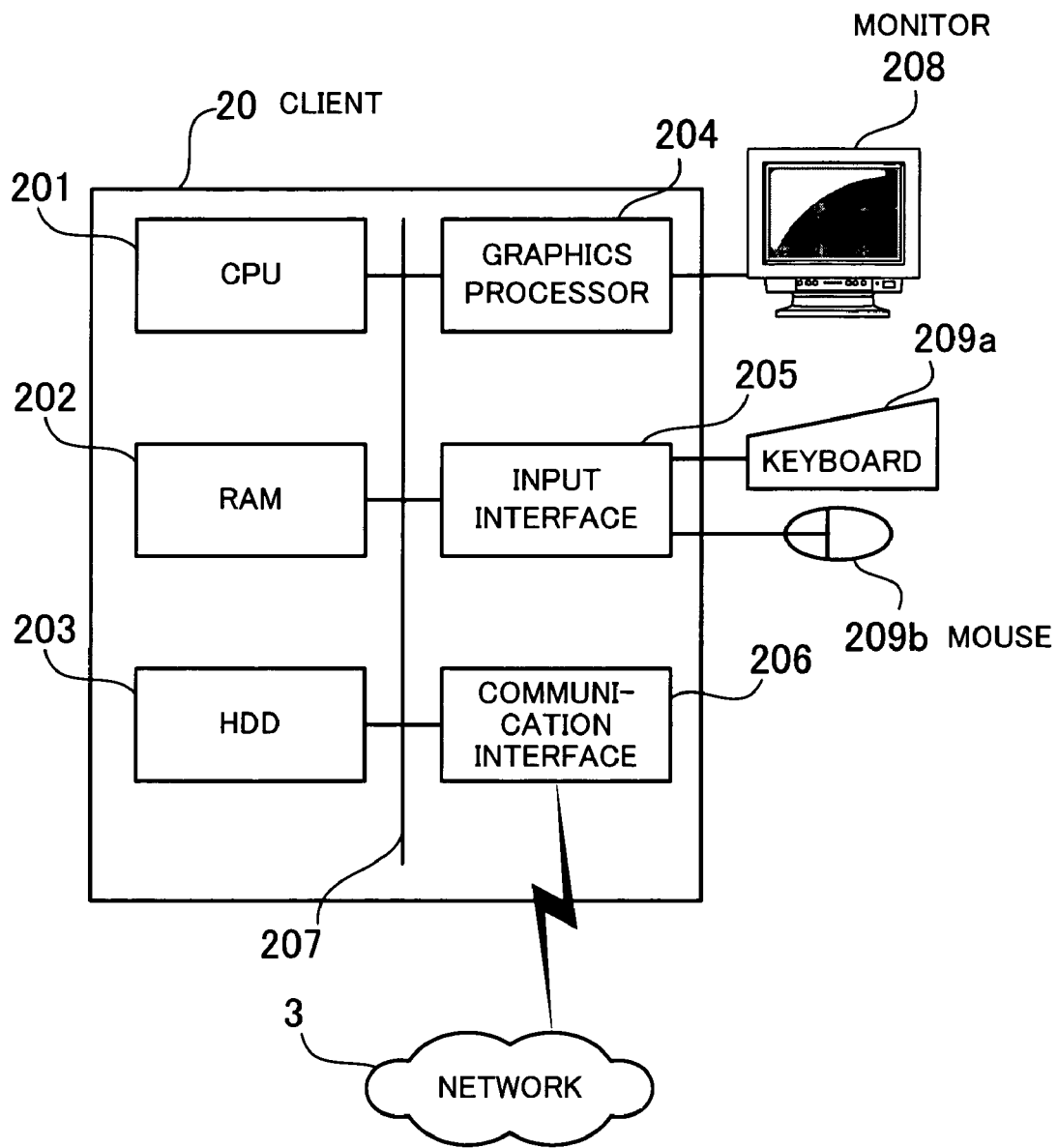
FIG. 3 is a block diagram exemplifying the hardware configuration of a client according to the first embodiment.

The hardware configuration of the client computer will be now described. FIG. 3 is a block diagram exemplifying the hardware configuration of the client according to the first embodiment.

The client 20 operates under the control of a CPU 201. The CPU 201 is connected, via a bus 207, with a RAM (Random Access Memory) 202, a hard disk drive (HDD) 203, a graphics processor 204, an input interface 205, and a communication interface 206.

The RAM 202 temporarily stores at least part of OS (Operating System) and application programs executed by the CPU 201. Also, the RAM 202 stores various other data necessary for the processing by the CPU 201. The HDD 203 stores the OS and application programs. The graphics processor 204 is connected with a monitor 208 and, in accordance with instructions from the CPU 201, interprets graphic commands and displays images on the screen of the monitor 208 in accordance with the graphic commands. The input interface 205 is connected with a keyboard 209a and a mouse 209b, and sends signals from the keyboard 209a and the mouse 209b to the CPU 201 via the bus 207. The communication interface 206 is connected to the network 3 and transmits/receives data to/from the server 10 via the network 3.

The processing function of the first embodiment is accomplished by the hardware configuration described above. Although FIG. 3 shows the hardware configuration of the client, the server also may have an identical hardware configuration.

Operation of the data transfer system configured as above will be now described.

An application start request is transmitted from the communication processor 22 of any of the client 1 (20a), client 2 (20b), . . . , client n (20c) to the server 10. The communication processor 15 of the server 10 receives the application start request via the network 3, and in response to the start request, the 3D AP 13 starts and generates graphics information.

Figure 4:
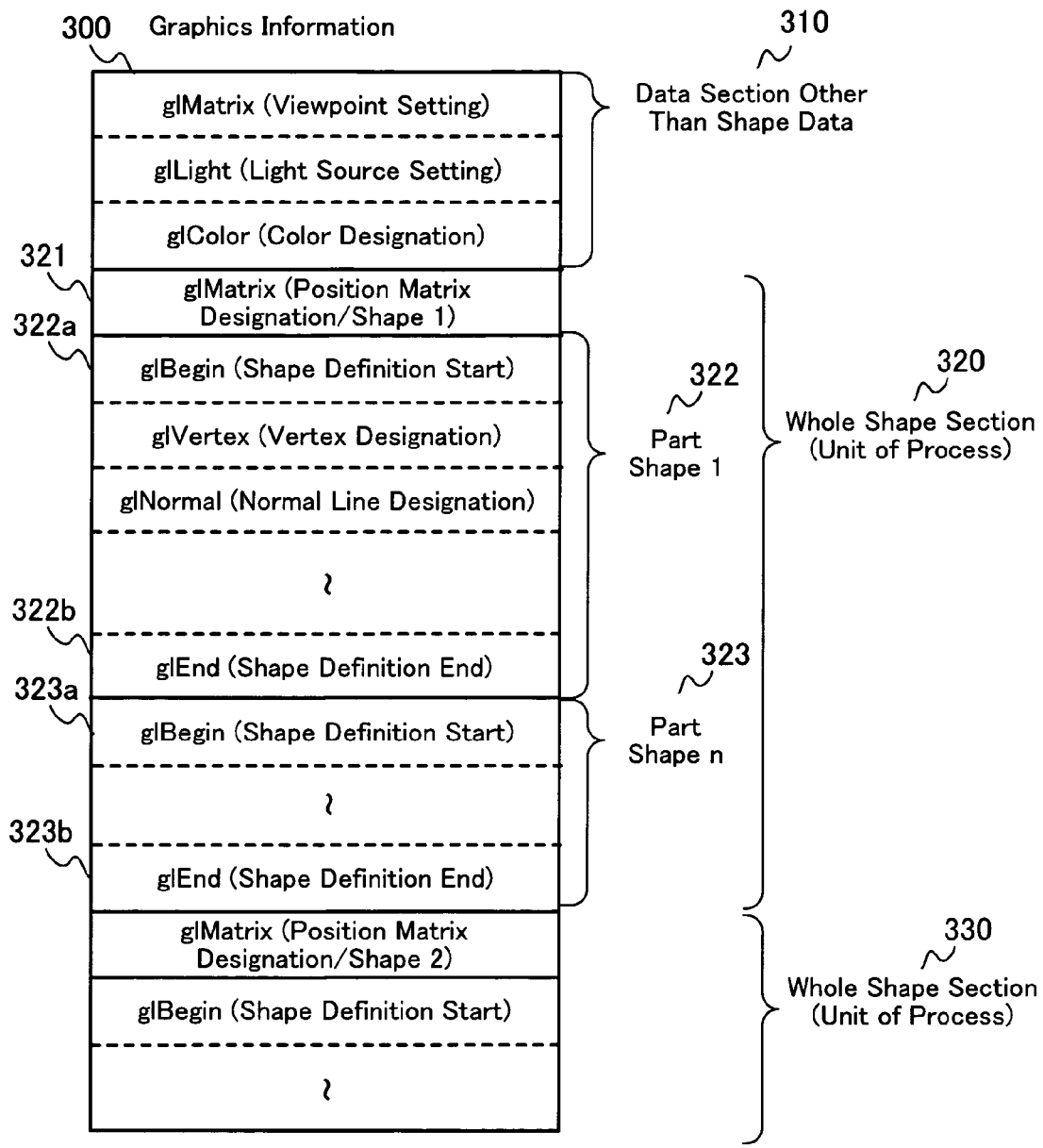
FIG. 4 exemplifies the arrangement of graphics information created by an application according to the first embodiment.

The graphics information will be explained. FIG. 4 exemplifies the arrangement of graphics information created by the application according to the first embodiment.

The graphics information 300 created by the 3D AP comprises a data section 310 including data other than shape data, and whole shape sections (in the figure, a whole shape section 320 for a shape 1, . . . , a whole shape section 330 for a shape n) each including shape data as a unit of process.

In the data section 310 is set data other than shape data indicative of shapes, such as viewpoint setting (glMatrix), light source setting (glLight), and color designation (glColor).

In each of the whole shape sections 320 and 330 is set shape information including shape data which is a group of graphic commands for drawing a shape as a unit of process. Each whole shape section, for example, the whole shape section 320 for the shape 1 includes position matrix designation (glMatrix) 321 for the shape 1, and a part shape 1 (322), . . . , a part shape n (323) which are each a graphic command sequence for drawing a part shape of the shape 1. Each part shape, for example, the part shape 1 (322) begins with shape definition start (glBegin) 322a, includes repetitions of vertex designation (glVertex) and normal line designation (glNormal), and ends with shape definition end (glEnd) 322b. Likewise, each subsequent part shape is defined between shape definition start (glBegin) and shape definition end (glEnd). The last part shape n (323) begins with shape definition start (glBegin) 323a and ends with shape definition end (glEnd) 323b.

The differential extraction unit 12 recognizes, as a unit of shape data (cache unit), a sequence of commands from the shape definition start (glBegin) 322a of the first part shape 1 of the shape 1 to the shape definition end (glEnd) 323b of the last part shape n, and stores the shape data in the corresponding client's cache table of the cache table 100.

Figure 5:
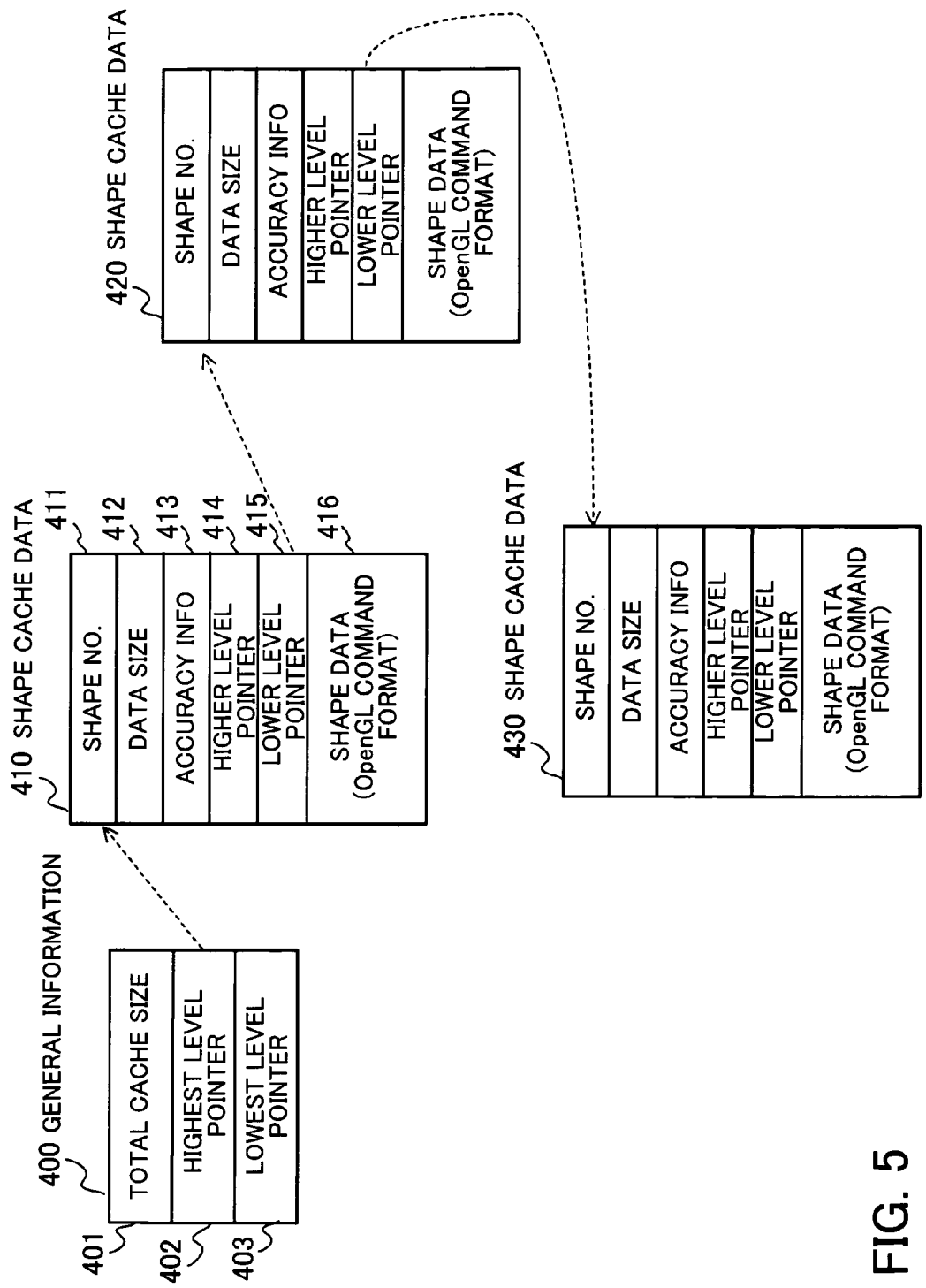
FIG. 5 exemplifies the arrangement of a cache table according to the first embodiment.

The arrangement of the cache table prepared for each client will be now described. FIG. 5 exemplifies the arrangement of such a cache table according to the first embodiment. The cache table created in the client 20 also has an identical arrangement.

The cache table includes general information 400 consisting of total cache size 401 and highest and lowest level pointers 402 and 403, and shape cache data 410, 420, 430, . . . .

For the total cache size 401 of the general information 400, the total cache size of the cache memory used is set. For the highest level pointer 402 is set pointer information specifying the shape cache data used latest, and for the lowest level pointer 403 is set pointer information specifying the shape cache data used earliest. These values are updated each time shape data is registered in the cache table.

Each of the shape cache data 410, 420, 430, for example, the shape cache data 410 includes a shape number 411 assigned at the time of registration, a data size 412 of the shape cache data, accuracy information 413 about the shape data, a higher level pointer 414 specifying the shape cache data immediately higher in level than this shape cache data, a lower level pointer 415 specifying the shape cache data immediately lower in level than this shape cache data, and shape data 416 of OpenGL command format. The shape data 416 is a sequence of commands from the shape definition start (glBegin) to the shape definition end (glEnd), explained above with reference to FIG. 4. The accuracy information 413 may be omitted as the case may be. By successively looking up the highest level pointer 402 and the lower level pointers of the individual shape cache data, it is possible to follow the sequence of registered shape cache data in order from the latest shape cache data. Also, by successively looking up the lowest level pointer 403 and the higher level pointers of the individual shape cache data, it is possible to follow the sequence of registered shape cache data in order from the oldest shape cache data.

The cache manager 14 of the server 10 and the cache manager 26 of the client 20 each manage the corresponding cache so that the total size of the registered shape cache data may not exceed the previously allotted range of the cache memory. Specifically, if the total cache size of shape cache data becomes greater than a maximum value, each cache manager deletes the registered shape cache data in order from the one which is not recently used, to spare an area for registering new shape cache data.

To this end, during the shape cache data search/registration process, the differential extraction unit 12 of the server 10 checks the graphics information in order and modifies the highest and lowest level pointers 402 and 403 and the higher and lower level pointers of the individual shape cache data so that the shape data in the graphics information may be set as the highest-level shape data. Specifically, when new shape cache data is registered, the highest level pointer 402 is modified so as to point to the newly registered shape cache data, and the lower level pointer of the newly registered shape cache data is set so as to point to the shape cache data which was highest in level until then. Similarly, the higher level pointer of the shape cache data which was the highest-level data until then is modified so as to point to the newly registered shape cache data. In the case where the shape data in the graphics information is already registered, the highest and lowest level pointers 402 and 403 and the higher and lower level pointers of the related shape cache data are modified so that the shape data may be set as the highest-level data. In this manner, a plurality of shape cache data are linked by the pointers in order from the highest-level shape cache data which is most recently used. In the illustrated example, the highest level pointer 402 points to the shape cache data 410 as the highest-level data, and the shape cache data 410 points to the shape cache data 420, which in turn points to the shape cache data 430. Also, each time the shape data is registered, the total cache size 401 is updated. The differential restoration unit 23 of the client 20 similarly modifies the pointers of newly registered shape cache data and of the shape cache data specified by the designation information and already registered in the cache table 101 in accordance with the graphics differential information acquired from the server 10 such that the multiple shape cache data are linked in order from the one most recently used.

The cache manager 14 checks the total cache size 401 at predetermined timing. If the total cache size is greater than the maximum value, the cache manager looks up the lowest level pointer 403 and deletes the shape cache data from the earliest used one until a predetermined space area is secured. The cache manager 26 of the client 20 also executes a similar process.

Figure 6:
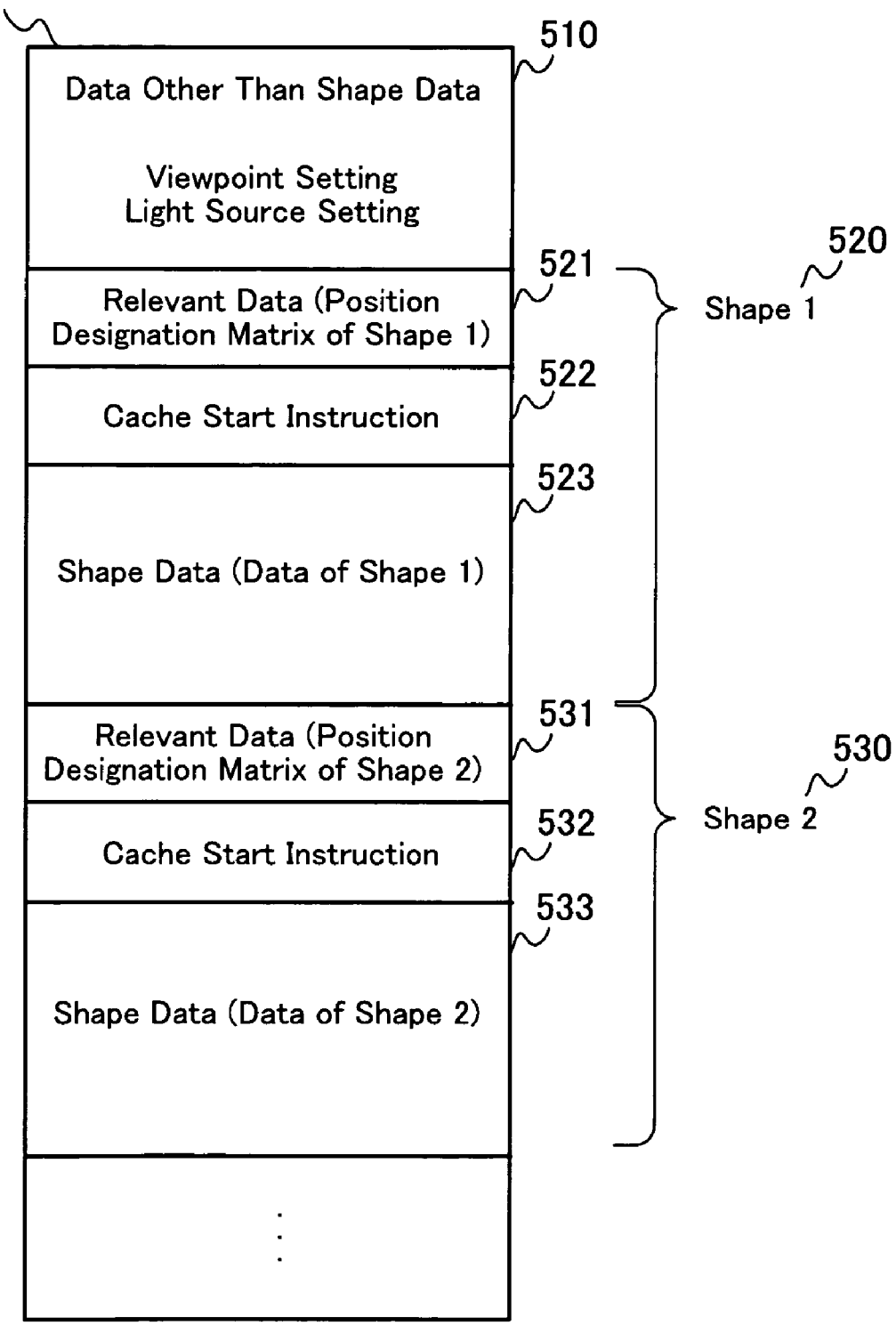
FIG. 6 exemplifies transmit data whereby shape data is transmitted according to the first embodiment.
Figure 7:
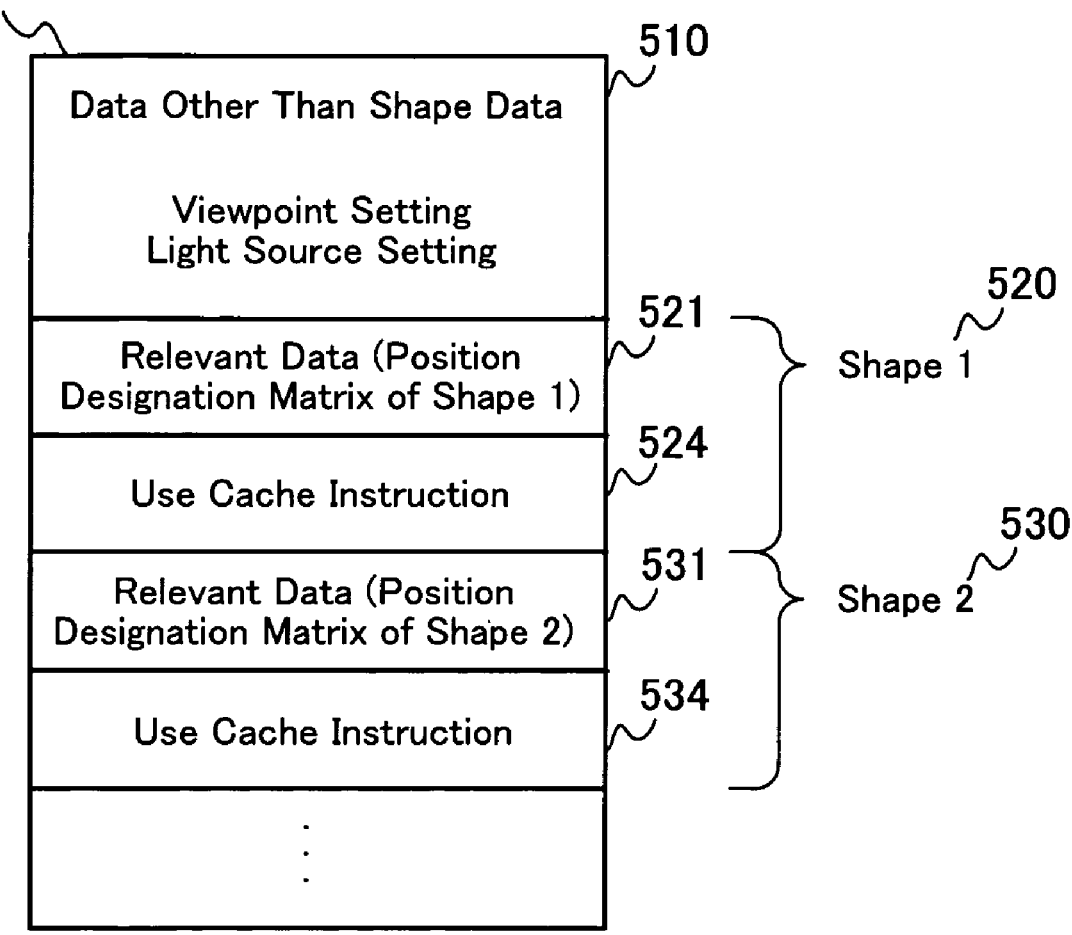
FIG. 7 exemplifies transmit data in which shape data is replaced by designation information.

A sequence of operations from the acquisition of the graphics information shown in FIG. 4 to the creation of graphics differential information to be transmitted to the client 20, performed by the differential extraction unit 12 of the server 10, will be now described with reference to FIGS. 6 and 7. FIG. 6 exemplifies transmit data including shape data according to the first embodiment, and FIG. 7 exemplifies transmit data in which shape data is replaced by designation information, wherein identical reference numerals are used to denote common parts.

The transmit data 500a and 500b each include data 510 other than shape data, and information sections each including shape data as a unit of process, namely, in the illustrated example, shape data for a shape 1 (520), shape data for a shape 2 (530), . . . .

The differential extraction unit 12 first transfers the data section 310 of the graphics information, other than the shape data, directly to a transmitting buffer which temporarily stores transmit data. Consequently, the data 510 other than the shape data, such as viewpoint setting and light source setting, is set in the transmitting buffer as part of the transmit data 500a, 500b.

Then, with respect to each whole shape section as a unit of process, the position matrix designation, which is not shape data, is set as relevant data 521 at the head of each shape data in the transmit data 500a, 500b. Thus, the relevant data 521 is set at the head area of the shape 1 (520), and relevant data 531 is set at the head area of the shape 2 (530).

Subsequently, search is performed to determine whether or not the shape data is registered in the corresponding cache table. Whether the shape data of the graphics information is identical with any of the shape data in the cache table or not may be determined by using a suitable collation method generally known. Such methods include, for example, a method of successively comparing the shape data with all of the registered shape data, and a method of creating collation keys based on the data and comparing the keys with each other.

If it is found as a result of the search that the shape data as a unit of process is not registered in the cache table, the shape data section of the graphics information is set as it is. At this time, a "CACHE START" command for instructing the start of cache is set, together with the shape number, in an area preceding the shape data. For example, where the shapes 1 and 2 are to be newly cached, a cache start instruction 522, which uses the shape number as an argument, and shape data 523 are set with respect to the shape 1 (520), as shown in FIG. 6. The shape data 523 consists of the group of commands from the shape definition start 322a to the shape definition end 322b associated with the shape 1 shown in FIG. 4. Similarly, a cache start instruction 532 and shape data 533 are set for the shape 2 (530).

On the other hand, if it is found as a result of the search that the shape data is registered in the cache table, the shape data section of the graphics information is replaced with information specifying the corresponding registered shape data. For example, where the shapes 1 and 2 are already registered, a "USE CACHE" command is set in the cache start instruction 522 and the shape data 523 for the shape 1 (520), thereby replacing these areas with a use cache instruction 524 as shown in FIG. 7. The use cache instruction 524 includes designation information specifying the corresponding registered shape cache data, such as the shape number of the registered shape cache data to be used. Similarly, the cache start instruction 532 and the shape data 533 for the shape 2 (530) are replaced with a use cache instruction 534.

On receiving the transmit data 500a, the client 20 registers the shape data following the cache start instructions 522 and 532, along with the specified shape numbers, in the cache table 101 in accordance with the cache start instructions. When the transmit data 500b is received thereafter, the client searches the cache table 101 on the basis of the use cache instructions 524 and 534, then extracts, from the cache table 101, the shape data corresponding to the specified shape numbers, and replaces the use cache instructions 524 and 534 with the extracted shape data. Consequently, the graphics information created by the application of the server 10 is restored. The restored graphics information is processed by the graphics processor 24 and displayed on the display device 25.

Thus, newly created shape data is transmitted together with a cache registration instruction, as shown in FIG. 6, but with respect to the registered shape data already cached, only the designation information instructing use of the cached data is transmitted. For example, in the case where manipulation is performed so as to rotate the three-dimensional shape displayed on the screen of the client 2, the shape data itself remains the same; therefore, the transmit data 500a of FIG. 6 is transmitted once and thereafter the transmit data 500b of FIG. 7 is transmitted.

This makes it possible to drastically cut down the amount of data transferred between the server and the client by the 3D AP run in the form of ASP. Also, since the data transfer amount can be cut down, groups of graphic commands, which are large in data amount as compared with image data, can be transferred at high speed. Consequently, the load on the server CPU can be lessened, making it possible to realize an application system with three-dimensional display performance suited to the operation of ASP. Especially, existing 3D AP's which are not optimized for client-server systems can be used as applications having three-dimensional display performance withstanding the operation in the form of ASP, without the need to modify the applications.

A data transfer process executed individually in the server and the client according to the first embodiment will be now described with reference to flowcharts.

Figure 8:
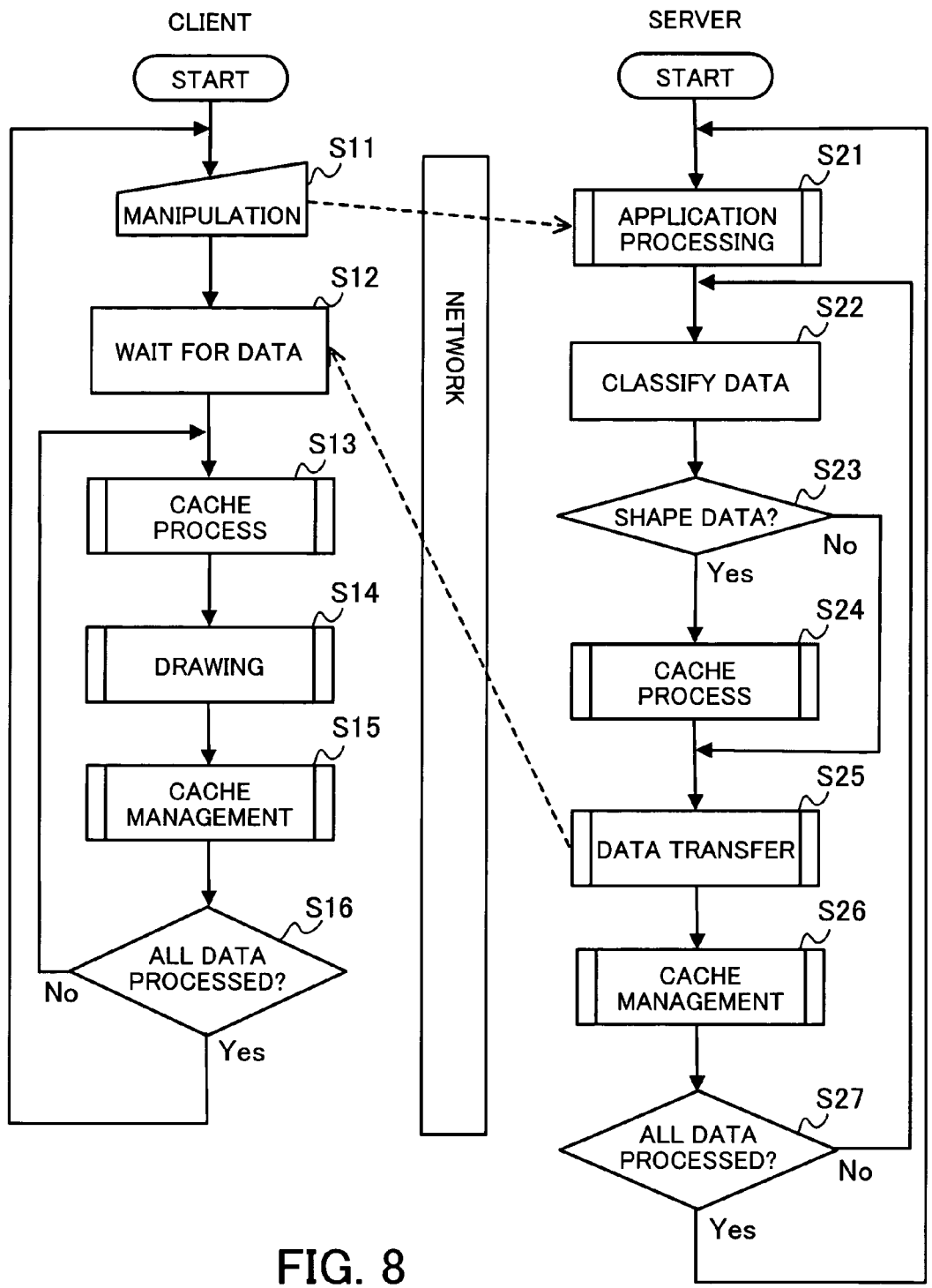
FIG. 8 is a flowchart illustrating a data transfer process according to the first embodiment.

First, an overall data transfer process will be explained with reference to the flowchart of FIG. 8 illustrating a data transfer procedure according to the first embodiment.

The process is started when the user at the client side performs manipulation after the server computer and the client computer are both started.

The client-side process will be explained first.

Step S11: The user at the client side manipulates an image, and thus the contents of the manipulation are transmitted to the server via the network.

Step S12: The client keeps waiting for data until graphics differential information is received from the server. On acquisition of the graphics differential information from the server, the process proceeds to Step S13.

After the contents of the manipulation are acquired from the client, the server performs the process described below.

Step S21: The server starts the 3D AP and performs a process requested by the manipulation to create graphics information.

Step S22: The server classifies the graphics information into two types, namely, shape data and data other than the shape data.

Step S23: It is determined whether or not any area has been classified as shape data as a result of the data classification in Step S22. If no shape data has been classified, the process proceeds to Step S25.

Step S24: Where a certain area has been classified as shape data, a cache process for registering the shape data in the cache and replacing transmit data is executed. The cache process will be described in detail later. As a result of the cache process, graphics differential information is set in the transmitting buffer.

Step S25: The graphics differential information created in Step S24 is transferred to the client.

Step S26: The cache size is checked, and when necessary, a cache management process is performed to delete the registered shape cache data. The cache management process will be described in detail later.

Step S27: It is determined whether or not processing of all data has been completed. If all data has not been processed yet, the flow returns to Step S22 to process the next area of the graphics information; if all data has been processed, the flow returns to Step S21 to wait for a next processing request.

After acquiring the graphics differential information, the client performs the process described below.

Step S13: Based on the acquired graphics differential information, the client performs a cache process for registering the shape cache data in the cache or restoring the specified shape data, with respect to one unit of process. Details of the client-side cache process will be described later. As a result of the cache process, the graphics information is restored.

Step S14: Based on the graphics information, a drawing process is performed to display a three-dimensional image corresponding to one unit of process.

Step S15: The cache size is checked, and when necessary, a cache management process for deleting the registered shape cache data is executed. Details of the cache management process will be described later.

Step S16: It is determined whether or not processing of all data has been completed. If all data has not been processed yet, the flow returns to Step S13 to process the next unit of process; if all data has been processed, the flow returns to Step S11 to wait for next manipulation.

Figure 9:
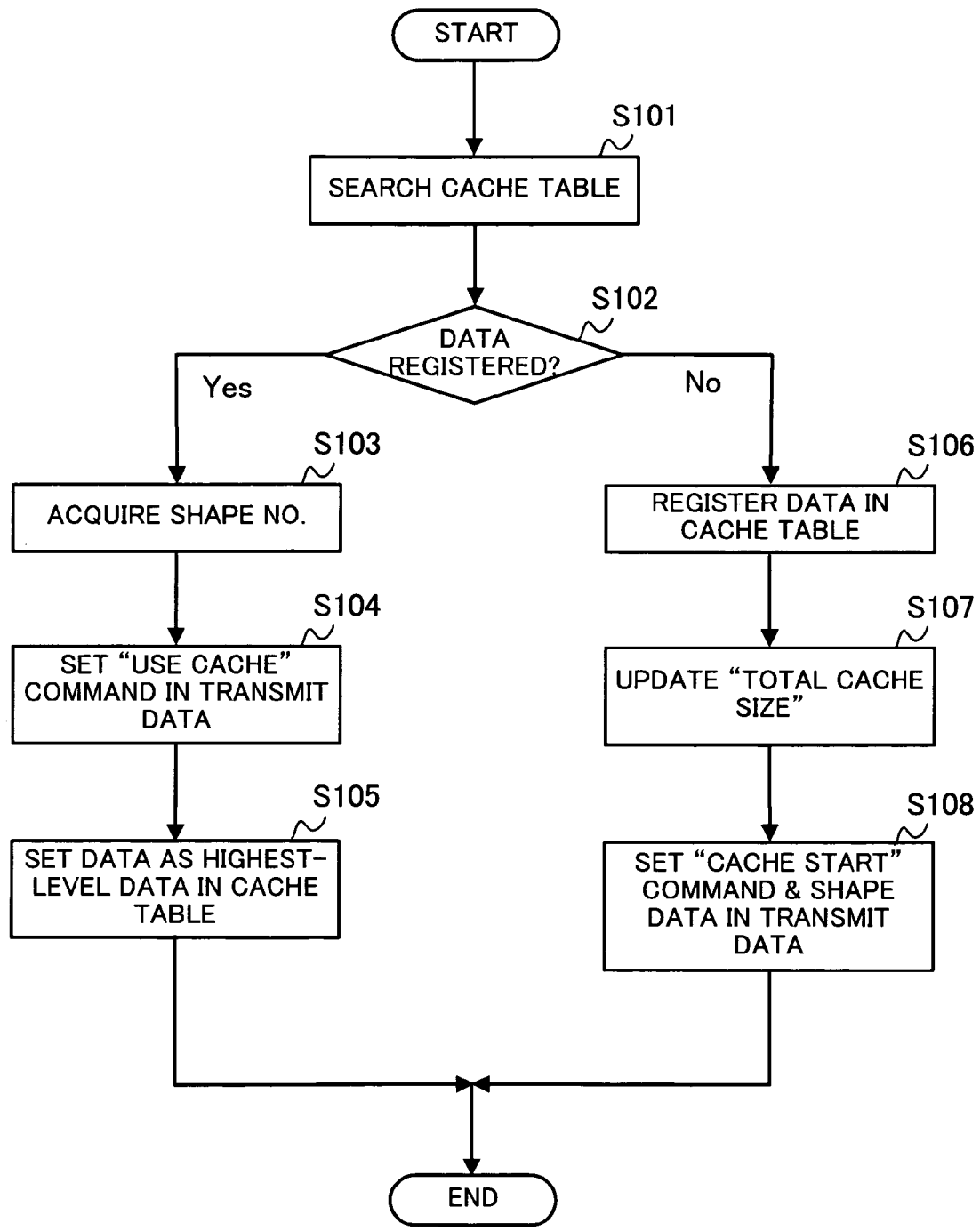
FIG. 9 is a flowchart illustrating a server-side cache process according to the first embodiment.

The server-side cache process will be now described. FIG. 9 is a flowchart illustrating a server-side caching procedure according to the first embodiment.

Step S101: The cache table is searched to determine whether or not shape cache data identical with current shape data of the graphics information is registered in the cache table.

Step S102: It is determined whether or not data has been found in Step S101, that is, whether or not the corresponding shape cache data is registered. If the shape cache data is registered, the process proceeds to Step S103; if not, the process proceeds to Step S106.

Step S103: Where the current shape data is registered, the shape number of the corresponding registered shape cache data is acquired.

Step S104: Using the acquired shape number as an argument, a "USE CACHE" command is set in the transmit data.

Step S105: The corresponding registered shape cache data, that is, the currently used shape cache data, is set as the highest-level data in the cache table, and the related information is rewritten.

Step S106: Where the current shape cache data is not registered, the shape data is registered in the cache table. Specifically, a unique shape number is assigned to the shape data, and the shape data is stored in a given area of the cache table together with the shape number. Also, the related information is rewritten so that the shape cache data may be the highest-level data in the cache table.

Step S107: The size of the currently registered shape cache data is added to the total cache size 401, thereby updating the total cache size 401.

Step S108: Using the set shape number as an argument, a "CACHE START" command is set in the transmit data together with the shape data.

Figure 10:
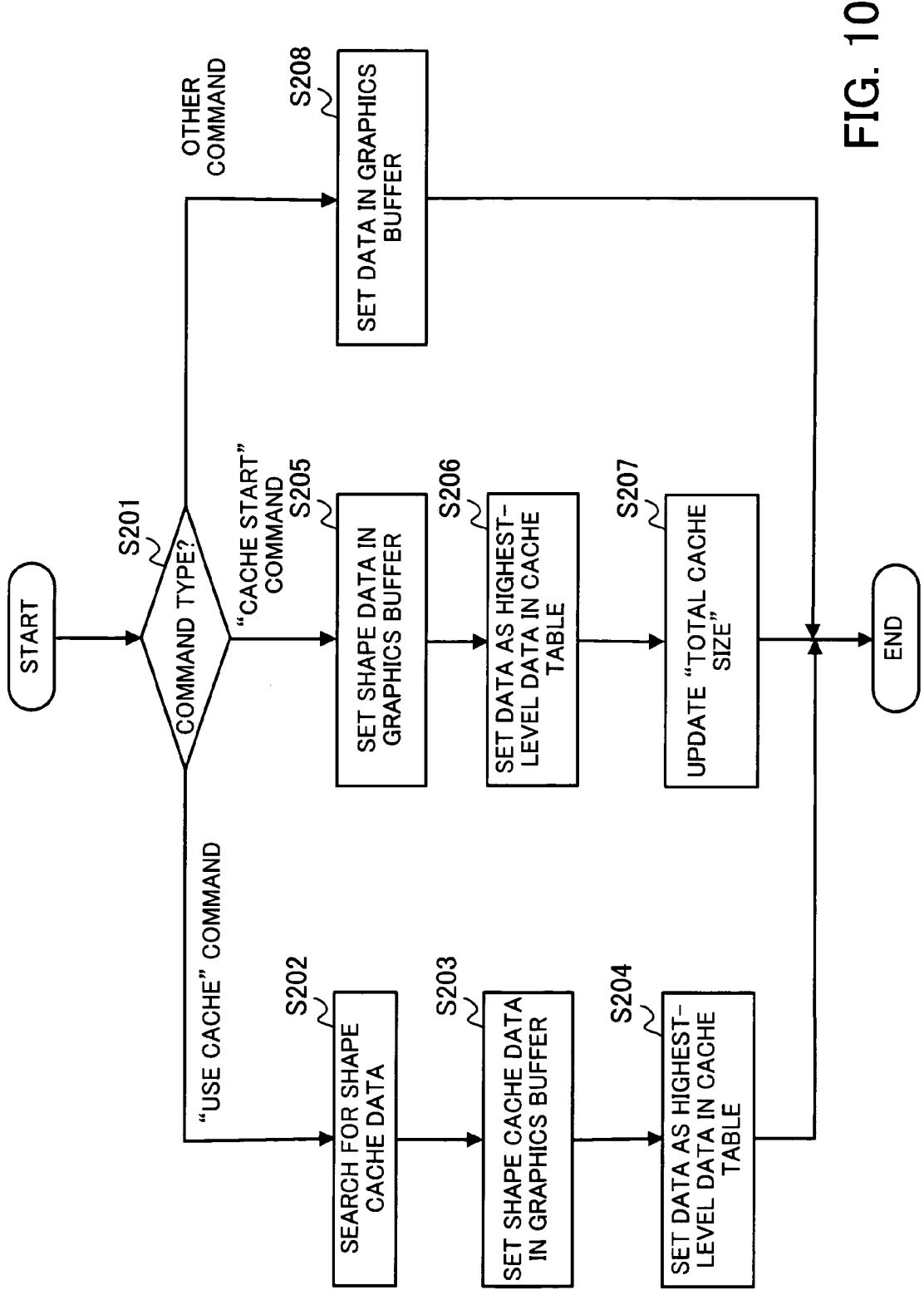
FIG. 10 is a flowchart illustrating a client-side cache process according to the first embodiment.

The client-side cache process will be now described. FIG. 10 is a flowchart illustrating a client-side caching procedure according to the first embodiment.

Step S201: The graphics differential information is checked to identify the command set in each given area thereof. If the command is a "USE CACHE" command, the process proceeds to Step S202, and if the command is a "CACHE START" command, the process proceeds to Step S205. If the command is a different command or no command is set, the process proceeds to Step S208.

Step S202: Where the set command is a "USE CACHE" command, the shape number set as the argument of the command is looked up and the client-side cache table is searched to extract the registered shape cache data with the corresponding shape number.

Step S203: The extracted shape cache data is set in a graphics buffer, whereby the graphics information is restored in the graphics buffer.

Step S204: The related information is rewritten so that the corresponding registered shape cache data may be the highest-level data in the cache table.

Step S205: Where the set command is a "CACHE START" command, the whole shape data succeeding the command is transferred to the graphics buffer.

Step S206: The shape data succeeding the command is registered in the cache table together with the specified shape number. Then, the related information is rewritten so that the registered shape cache data may be the highest-level data in the cache table.

Step S207: The size of the currently acquired shape data is added to the total cache size 401, thereby updating the total cache size 401.

Step S208: Where the set command is some other command, the data should be classified as data different from shape data, and therefore, the data is set in the graphics buffer as it is.

Figure 11:
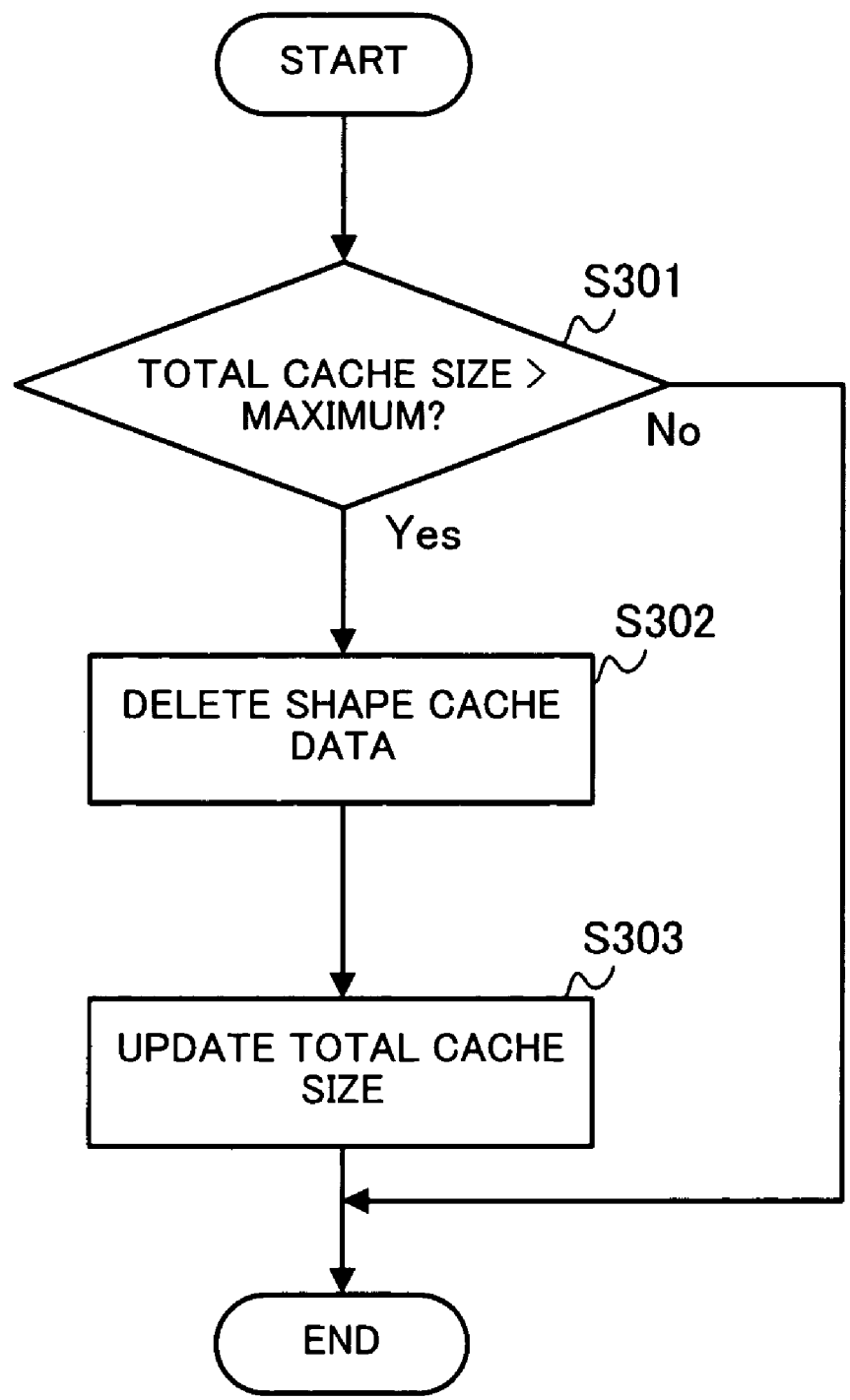
FIG. 11 is a flowchart illustrating a server/client cache management process according to the first embodiment.

The cache management process performed in each of the server and the client will be now described. FIG. 11 is a flowchart illustrating a server/client cache management procedure according to the first embodiment.

Step S301: The total cache size 401 is compared with the maximum value to determine whether or not the total cache size 401 is greater than the maximum value. If the maximum value is not exceeded, the process is ended.

Step S302: Where the total cache size 401 is greater than the maximum value, the shape cache data is deleted in order from the one which was used earliest, in accordance with the pointer information of the cache table. The shape cache data is deleted until the total size becomes smaller than a "POST-DELETION SPECIFIED VALUE," to thereby spare an area for registering next shape cache data. The "POST-DELETION SPECIFIED VALUE" is set to a desired value matching the system, and in cases where the deletion process is to be executed infrequently, for example, the "POST-DELETION SPECIFIED VALUE" is set to a small value.

Step S303: The size of the deleted shape cache data is subtracted from the total cache size 401, thereby updating the total cache size 401.

The data transfer process of the first embodiment is performed by executing the aforementioned processes.

A second embodiment will be now described. In the first embodiment described above, if the coordinates of shape data require different accuracy (resolution) even though the shape is the same, the shape data is in its entirety transmitted so as to be newly registered in the cache. In the second embodiment, the coordinate accuracy is determined, and if no high accuracy is required, some coordinates are approximated to thereby reduce the transmit data amount. If the display size is changed thereafter and thus higher-accuracy data needs to be transmitted, differential information for enhancing the coordinate accuracy is transmitted. Also, normal line data is transformed into a format requiring a smaller amount of data.

The processing functions of a three-dimensional application system according to the second embodiment are performed by elements identical with those of the first embodiment shown in FIG. 2. In the following description, therefore, the reference numerals of the elements shown in FIG. 2 will be used to explain the functions of the second embodiment. Also, the three-dimensional application system of the second embodiment can be implemented by computers having the same hardware configuration as that shown in FIG. 3.

The principles of coordinate accuracy determination and data amount reduction, employed in the second embodiment, will be explained.

Figure 12:
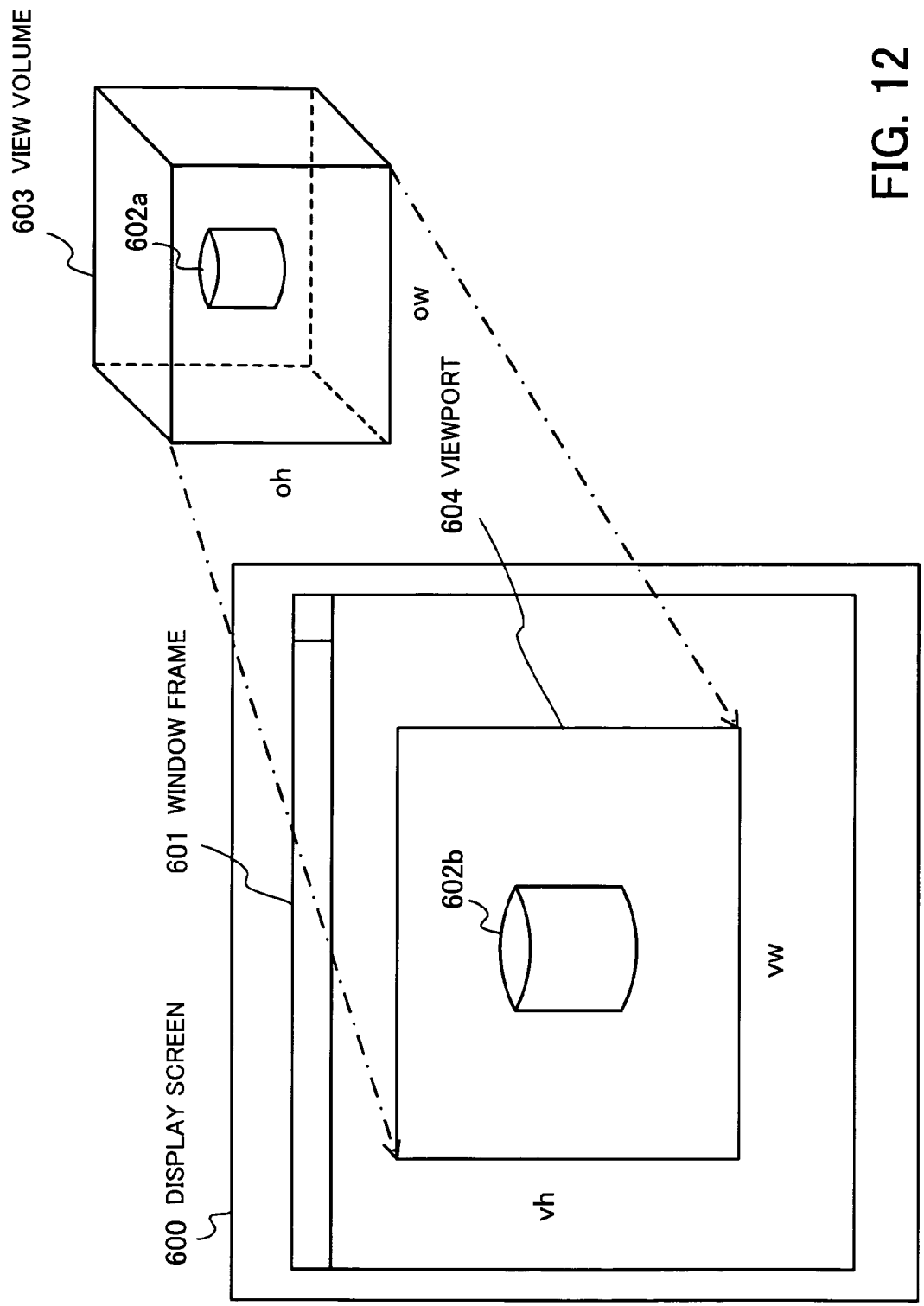
FIG. 12 illustrates accuracy information used in determining the accuracy of coordinates of shape data.

FIG. 12 illustrates accuracy information used in determining the accuracy of coordinates of shape data. In the figure, a three-dimensional shape 602b is displayed within a window frame 601 defined on the display screen 600 of the client.

When a three-dimensional shape is displayed on screen, the position and size of the shape are transformed by means of a model view matrix. The coordinates of the three-dimensional shape 602a obtained as a result of the transformation are compared with a view volume 603, and if the coordinates fall within the view volume 603, the three-dimensional shape 602a is judged to be an object of display. A viewport 604 is a value for making the image in the view volume 603 correlated with pixels on the screen, and basically, the value {viewport width (vw)/viewport height (vh)} is equal to the value {view volume width (ow)/view volume height (oh)}. Accordingly, a coordinate per pixel on the screen can be represented by ow/vw. Since ow/oh and vw/vh are basically equal to each other, oh/vh may be used in place of ow/vw. The coordinate per pixel is calculated in this manner, and using the calculated coordinate, the coordinates of the three-dimensional shape 602a are transformed into pixel values.

At the time of transformation, coordinates smaller than the calculated coordinate are transformed into the same pixel value on the screen. Thus, where a group of coordinates are to be transmitted, the first coordinate is transmitted as it is, and if the second and succeeding coordinates are within the range ow/vw relative to the first coordinate, such coordinates are regarded as identical with the first coordinate. Namely, succeeding coordinates can be approximated using the first coordinate, without transmitting the data itself.

In the second embodiment, the coordinate accuracy is determined by means of the model view matrix, the view volume and the viewport in accordance with the aforementioned principles. Where the coordinates can be approximated using other coordinates, the coordinates are not transmitted, thereby reducing the data amount.

Further, in the second embodiment, normal line data is transformed from a three-dimensional vector format, which is expressed by horizontal measure (hereinafter x), vertical measure (hereinafter y) and depth measure (hereinafter z) in a three-dimensional orthogonal coordinate system, to an expression of angle×2(θ1, θ2), in order to reduce the data amount. All of the normal lines glNormal used in the embodiment are unit vectors, and therefore, no problem arises if their data is transformed to the expression of angle×2. As a method of transformation, the following equations:

$$\theta 1 = y/\text{arc tangent of } x$$

$$\theta 2 = z/\text{arc tangent of } x \tag{1}$$

may be used, for example.

Normal lines are involved with the face shading process in terms of display. The data amount can be reduced to ⅔ through the transformation from the x-y-z format to the format using θ1 and θ2. For θ in terms of shading display, however, the appearance does not perceptibly change (only the glossiness of faces subtly changes) even if the accuracy of θ is lowered to some extent. Especially, in the case of CAD applications which are not intended to pursue enhanced appearance or reality, no practical problem arises if the accuracy of θ is considerably lowered. For example, the data amount needed for a single normal line is 12 bytes (4 bytes×3) in the case of floating format. If the format is transformed into θ1 and θ2 and the accuracy of θ is lowered on the assumption that a CAD application is used, then the required data amount per θ can be reduced to 1 byte. Consequently, the data amount can be reduced to 2 bytes.

The processing functions for performing the coordinate accuracy determination and the normal line transformation process described above are incorporated in the differential extraction unit 12 of the server 10 and the differential restoration unit 23 of the client 20, shown in FIG. 2.

The differential extraction unit 12 of the server 10 classifies the graphics information generated by the 3D AP 13 into "data other than shape data" and "shape data". Further, the differential extraction unit determines whether or not the "data other than shape data" is related with model view matrix, view volume and viewport, and if the decision is affirmative, the set values are stored. The data other than the shape data is directly set in the transmitting buffer, and it is determined whether or not the shape data is already registered as the shape cache data. If the same data is registered as the shape cache data, the shape cache data is set as the highest-level data in the cache table. Further, if the already transmitted data registered in the shape cache data is low in coordinate accuracy, the accuracy determination is performed. If the already transmitted data is high in accuracy or if high-accuracy data need not be transmitted though the accuracy of the already transmitted data is low, the shape data section of the transmit data 500a, in which the shape data is to be set, is replaced with the "USE CACHE INSTRUCTION" including the shape number as an argument, thereby creating the transmit data 500b as shown in FIG. 7. If the already transmitted data is low in accuracy and high-accuracy data needs to be transmitted, coordinate differential data is added to the format of the transmit data 500b, that is, the transmit data format with the "USE CACHE INSTRUCTION" including the shape number as an argument.

Figure 13:
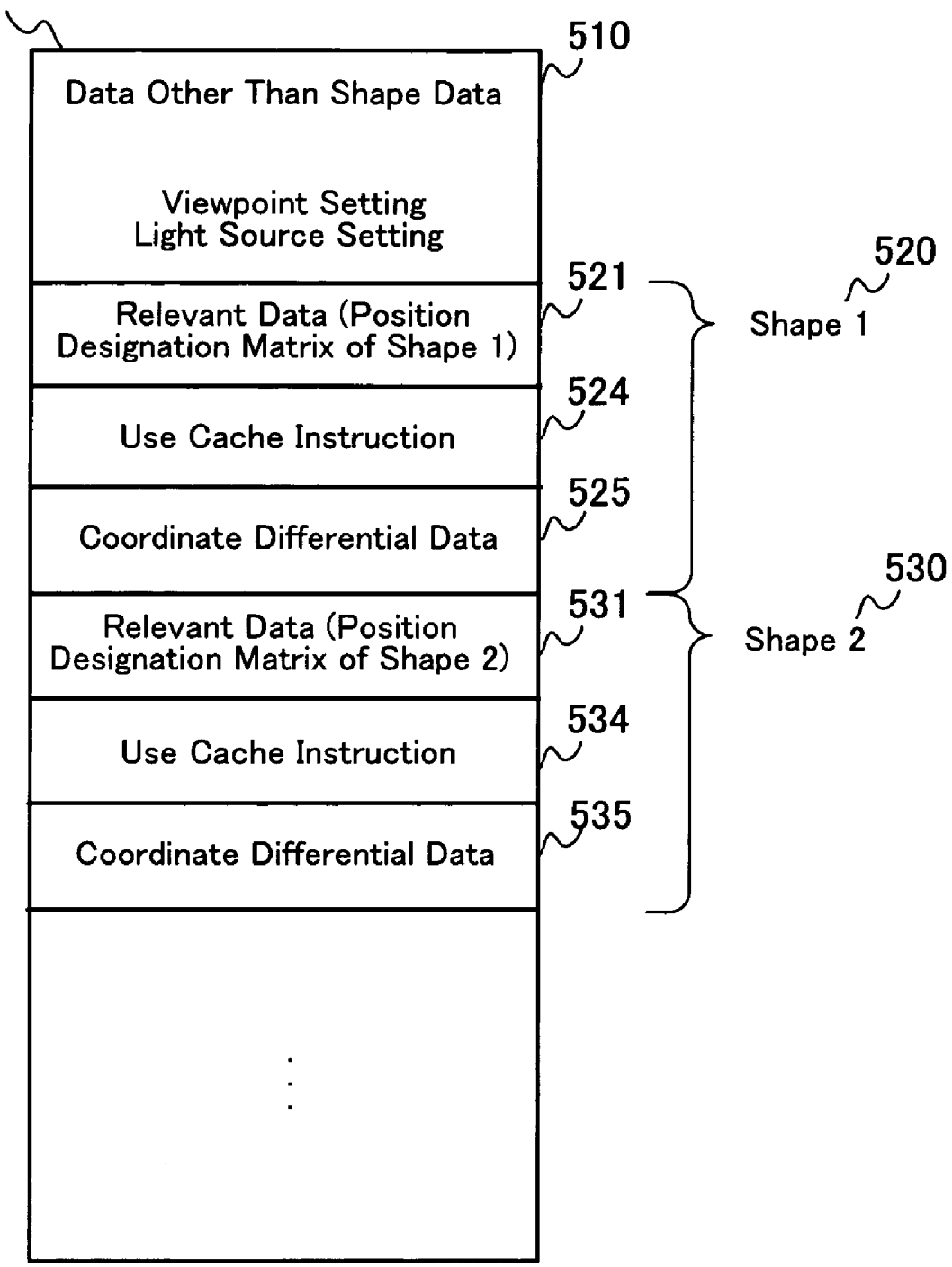
FIG. 13 exemplifies transmit data whereby coordinate differential data for enhancing the coordinate accuracy is transmitted according to a second embodiment.

FIG. 13 exemplifies transmit data including the coordinate differential data for enhancing the coordinate accuracy according to the second embodiment. In the figure, identical reference numerals are used to denote elements identical with those shown in FIGS. 6 and 7, and description of such elements is omitted.

When it is necessary to transmit data with higher accuracy than the already transmitted data, coordinate differential data 525 for enhancing the coordinate accuracy, besides the use cache instruction 524, is set with respect to, for example, the shape 1 (520) in the transmit data 500c. Similarly, coordinate differential data 535 is set with respect to the shape 2 (530). The formats of the transmit data 500c and 500b can be mixed on a shape-by-shape basis.

If the same data does not exist, new shape cache data is created and stored, and also the cache start instruction and the shape data are transmitted using the format of the transmit data 500a as shown in FIG. 6. In this case, the degree of accuracy required for the display at the client side is calculated in advance, and if it is judged that high coordinate accuracy is not required, some coordinates are approximated, thereby reducing the transmit data amount. Also, the normal line data is transformed from the x-y-z vector format to the format θ×2, to reduce the data amount.

Thus, where a three-dimensional shape displayed on the screen is manipulated so as to rotate, for example, the transmit data 500a including the shape data is transmitted once, and after this, the transmit data 500b including the use cache instruction, in place of the shape data section, is transmitted. If the three-dimensional shape is thereafter enlarged and higher coordinate accuracy is required because of the specified rate of enlargement, the transmit data 500c including the coordinate differential data is transmitted.

On receiving the transmit data 500c, the differential restoration unit 23 of the client 20 searches for shape cache data corresponding to the shape number specified in the "USE CACHE INSTRUCTION", then modifies the coordinates in the shape cache data found as a result of the search, by using the coordinate differential data, and uses the modified data as the original shape data.

Figure 14:
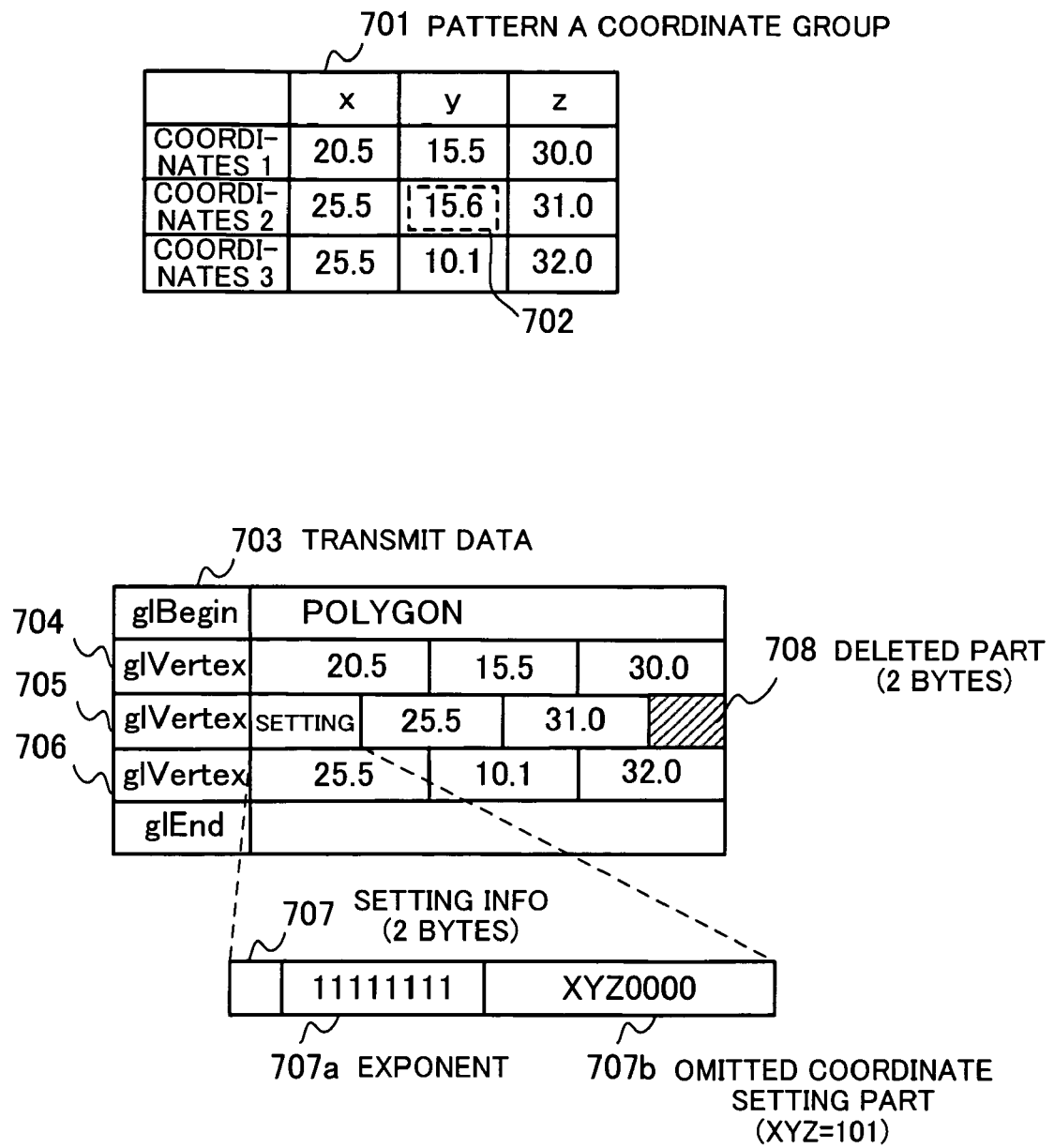
FIG. 14 illustrates a specific example of how the amount of data is reduced by approximating a coordinate according to the second embodiment.

The following describes the manner of how the data amount is reduced by replacing coordinates with approximate values in accordance with the coordinate accuracy determination. FIG. 14 illustrates a specific example of how the data amount is reduced by approximating a coordinate according to the second embodiment.

First, based on the model view matrix, the view volume and the viewport, the accuracy required for the display screen of the client is calculated. In this instance, the required accuracy is determined based on ow/vw, by using the view volume width (ow) and the viewport width (vw). For example, if ow=100 and vw=500, then ow/vw=0.2; therefore, if the difference between a certain coordinate and a reference coordinate is within the range of 0.2, it is judged that the coordinate can be approximated using the reference coordinate.

The approximation procedure will be now explained with reference to a pattern A. In the pattern A are set a group 701 of coordinates of certain shape data to be transmitted to the client, namely, three sets of coordinates 1, 2 and 3. Where the coordinates 1 are reference coordinates, the difference between the y coordinate 702 of the coordinates 2 and the y coordinate of the reference coordinates 1 is within the range of 0.2, and thus the y coordinate of the coordinates 2 can be approximated using the y coordinate of the coordinates 1. Accordingly, transmit data is set with the y coordinate 702 of the coordinates 2 deleted.

In the transmit data 703, the pattern A coordinate group 701 are set as polygon data. The coordinates 1 are set as glVertex 704, the coordinates 2 as glVertex 705, and the coordinates 3 as glVertex 706. Each coordinate constitutes a floating format (4 bytes) expressed in floating-point notation. Among the coordinates, the y coordinate of the coordinates 2 of glVertex 705 can be approximated using the y coordinate of the coordinates 1; therefore, setting information 707 indicating the omission of the y coordinate is set and the y coordinate is deleted. Consequently, a 2-byte deleted part 708, which corresponds to the difference between the 4-byte y coordinate and the 2-byte setting information, is created, whereby the data amount can be reduced by 2 bytes.

The setting information 707 is a value indicating the omission of data. In the case of the IEEE 754 floating format generally used, the value "255" (in binary notation, 11111111B) is usually not set in the exponent 707a because "255" is either "not a number" or infinity. Thus, the exponent 707a is used in such a way that the value "255" set in the exponent bears a special significance, that is, the omission of data. In this case, the data length is set to 2 bytes, and the bits succeeding the exponent 707a are used to indicate which coordinates are omitted. For example, the bits indicated by XYZ in an omitted coordinate setting part 707b are used in such a manner that the bit "1" indicates non-omission of the corresponding coordinate. In the illustrated example, XYZ=101, which indicates that the y coordinate is omitted.

Figure 15:
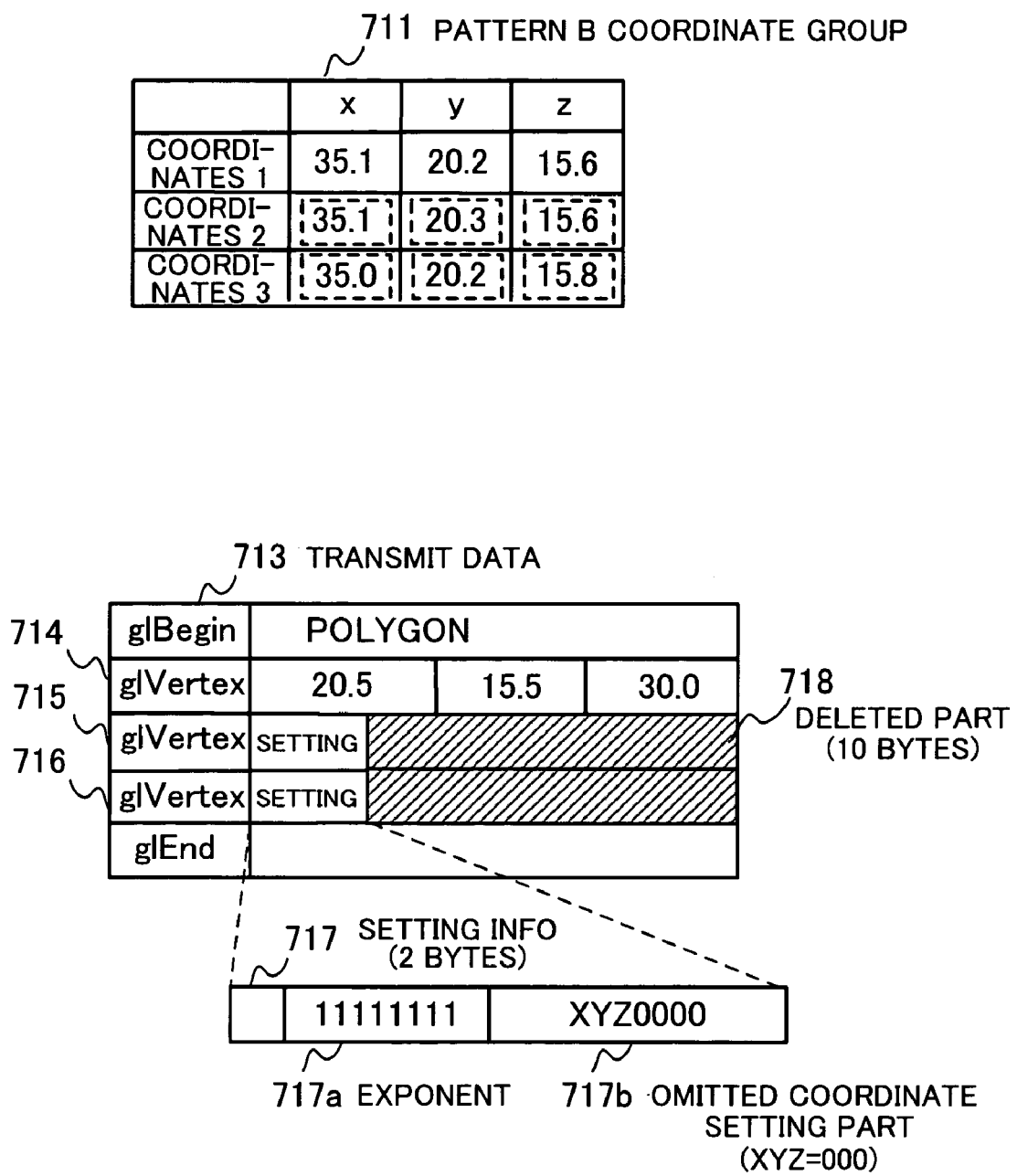
FIG. 15 illustrates another specific example of how the data amount is reduced by approximating coordinates according to the second embodiment.

Another specific example of how the data amount is reduced by approximating coordinates according to the second embodiment will be now explained with reference to FIG. 15, wherein a greater amount of data can be reduced than in the case of the pattern A shown in FIG. 14. In the following, it is assumed that the required accuracy is the same as that for the pattern A.

Where coordinates 1 of a pattern B coordinate group 711 are reference coordinates, the differences between coordinates 2 and 3, indicated by dashed rectangles, and the respective reference coordinates 1 are smaller than 0.2, and thus all of the coordinates 2 and 3 can be approximated using the coordinates 1. Accordingly, transmit data 713 is set with the coordinates 2 and 3 deleted. Specifically, in the transmit data 713, all of the coordinates 1 are set as glVertex 714, and with respect to glVertex 715 associated with the coordinates 2 and glVertex 716 associated with the coordinates 3, setting information is set which indicates that all of the x, y and z coordinates are to be approximated using the respective coordinates 1. Thus, as in the case of the pattern A, the exponent 717a of the setting information 717 indicates that the coordinates are omitted, and the omitted coordinate setting part 717b indicates that all of the x, y and z coordinates are omitted (XYZ=000). Consequently, the data amount of x, y and z coordinates, which equals 4 bytes×3, can be reduced to 2 bytes, thus creating a 10-byte deleted part 718 for each set of coordinates.

On receiving the transmit data, the client substitutes the already received data for the omitted data. FIGS. 16A and 16B exemplify a client-side coordinate approximation process according to the second embodiment, wherein FIG. 16A shows a client-side coordinate group of the pattern A shown in FIG. 14, and FIG. 16B shows a client-side coordinate group of the pattern B shown in FIG. 15.

The pattern A is transmitted to the client with the y coordinate of the coordinates 2 omitted, as mentioned above. At the client side, the y coordinate of the coordinates 1 is set for the omitted y coordinate of the coordinates 2, as shown in the client-side pattern A coordinate group 721.

Likewise, the pattern B is transmitted to the client with all of the coordinates 2 and 3 omitted. At the client side, the individual values of the coordinates 1 are set for the respective omitted coordinates, as shown in the client-side pattern B coordinate group 731.

The aforementioned process makes it possible to omit those coordinates which are replaceable with approximate values, among those set in the transmit data, thereby reducing the transmit data amount.

Figure 17:
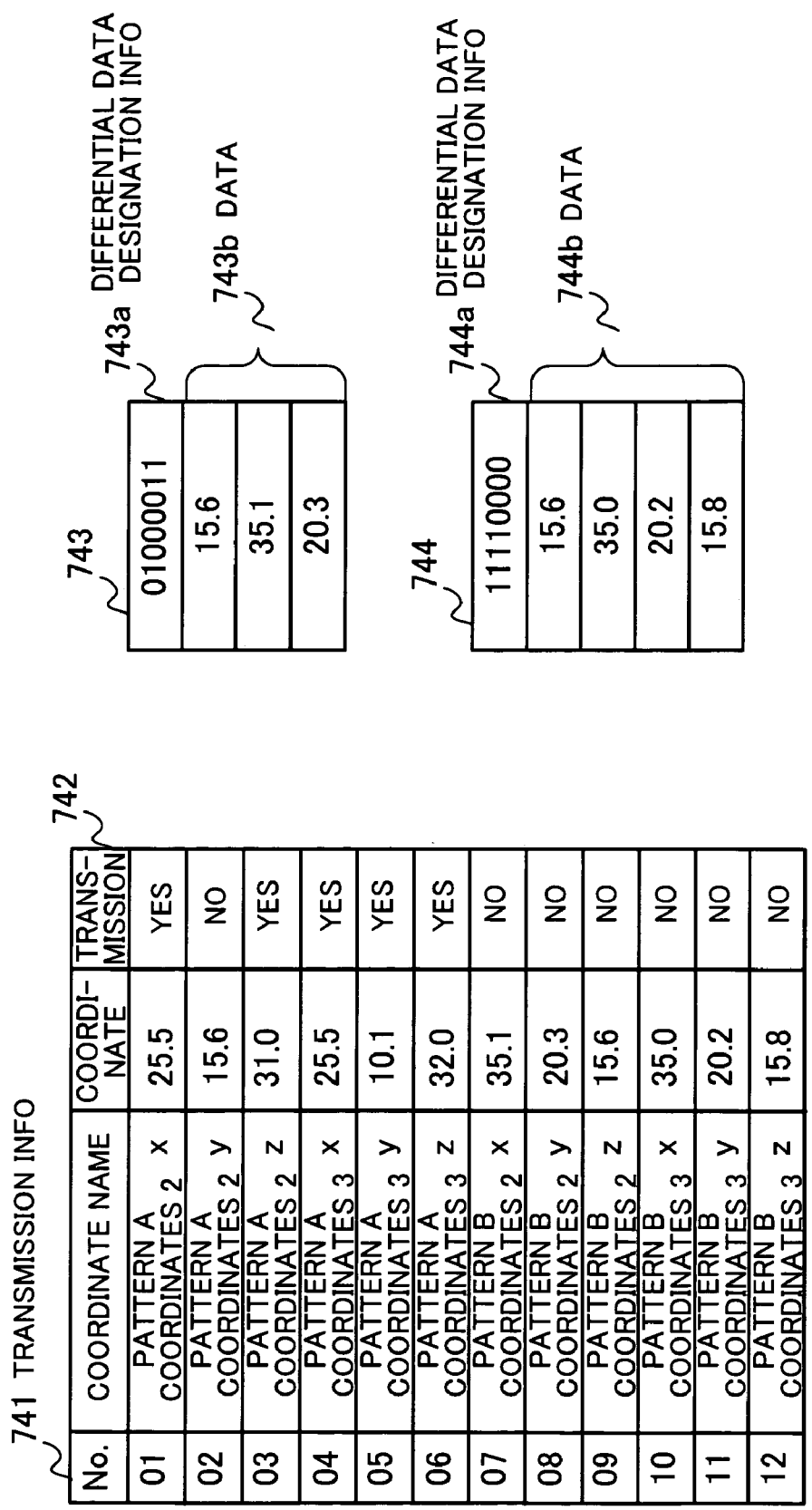
FIG. 17 illustrates a specific example of a coordinate differential data transmission process according to the second embodiment.

The following describes a process of transmitting the coordinate differential data shown in FIG. 13, executed when higher-accuracy data is required. FIG. 17 illustrates a specific example of the coordinate differential data transmission process according to the second embodiment.

During the aforementioned approximation process, the differential extraction unit 12 of the server 10 creates records indicating, with respect to the coordinates to be transmitted, whether or not accurate coordinates have been transmitted. For example, as shown in the figure, transmission information 741 indicating whether accurate coordinates have been transmitted to the client or not is set with respect to the individual coordinates of the patterns A and B. The transmission information 741 includes data about coordinate names, coordinate values, and transmission 742 indicating whether or not the coordinates have been transmitted. As the transmission 742, "YES" is set for the coordinates which have been transmitted, and "NO" is set for the coordinates which have not yet been transmitted. The coordinates 1 are always transmitted, and therefore, are not included in the transmission information 741. Where the display size is changed and higher-accuracy data is required as a result, the transmission information 741 is looked up and the untransmitted coordinates are transmitted as the coordinate differential data. The coordinate differential data 743, 744 comprises differential data designation information 743a, 744a specifying the differential data, and coordinate data 743b, 744b. The differential data designation information 743a, 744a is information indicating which coordinates are being transmitted, and "1" is set for the bits corresponding to the numbers (Nos.) in the transmission information 741 assigned to the coordinates being transmitted. For example, the bits "01000011" set in the differential data designation information 743a correspond to the respective coordinates from No. 1 to No. 8 and indicate that the coordinates of Nos. 2, 7 and 8 are being transmitted, and the corresponding coordinates are set as the data 743b. Similarly, "11110000" set in the differential data designation information 744a indicates that the coordinates of Nos. 9 through 12 are being transmitted, and the corresponding coordinates are set as the data 744b.

In this manner, only the untransmitted coordinates are transmitted, whereby the smallest possible amount of differential information is transmitted.

In the above description, the coordinate command (glVertex) occurs consecutively, but in some cases, the glVertex command does not occur consecutively, for example, the normal line designation command (glNormal) and glVertex occur alternately. Even in such cases, the glVertex commands between glBegin and glEnd are treated as a sequence of coordinates.

Figure 18:
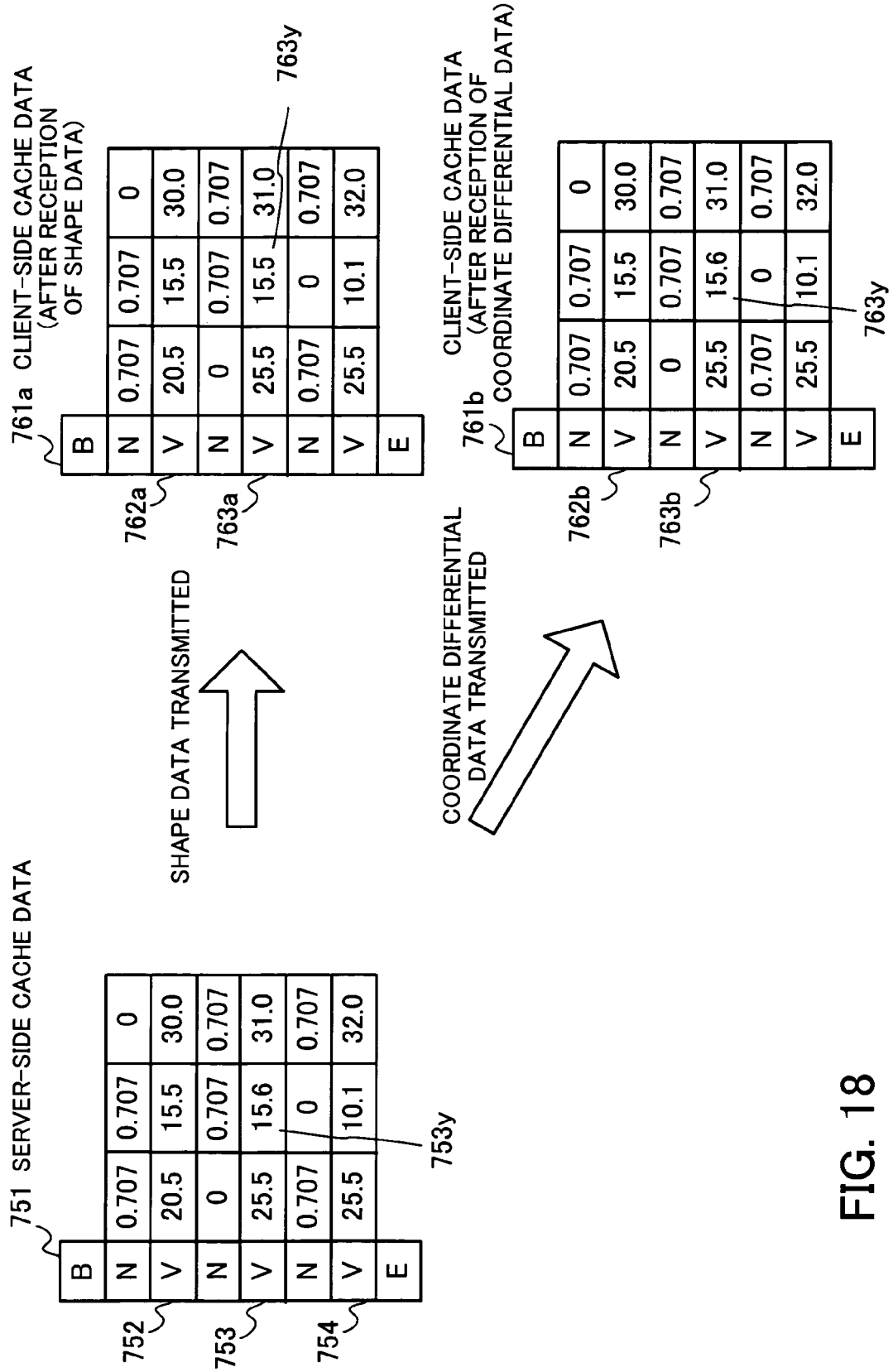
FIG. 18 illustrates a process executed according to the second embodiment in cases where glVertex command does not occur consecutively.

FIG. 18 illustrates a process executed according to the second embodiment in cases where the glVertex command does not occur consecutively. In the figure, B denotes glBegin, N denotes glNormal, V denotes glVertex, and E denotes glEnd.

In server-side cache data 751, glVertex and glNormal occur alternately, and in the approximation process, glVertex commands 752, 753 and 754 are treated as a sequence of coordinates. In the illustrated example, using glVertex 752 as reference data, the aforementioned accuracy determination and approximation process are carried out. Where the range is 0.2 as in the aforementioned case, the y coordinate 753y of glVertex 753 can be approximated using the y coordinate of glVertex 752. Accordingly, the shape data is transmitted to the client with the y coordinate omitted. When the data is transmitted, the values of glNormal are transformed from the x-y-z coordinate system to the format using θ1 and θ2.

The client processes the thus-transmitted data and obtains client-side cache data 761a. At this time, the y coordinate of glVertex 762a is set for the y coordinate 763y of glVertex 763a, which was omitted in the transmit data. The values of glNormal are set after being transformed to the original x-y-z format.

When the need for high accuracy arises thereafter, the untransmitted y coordinate 763y of glVertex 763b is transmitted to the client as the coordinate differential data, and the y coordinate 763y of glVertex 763b in the client-side cache data 761b is corrected to the accurate value.

Thus, in the second embodiment, the amount of transmit data is reduced taking account of the accuracy of shape data, whereby the time required for the transmission can be shortened. Especially, in the case of transferring a large amount of shape data, some coordinates can be omitted, making it possible to shorten the waiting time needed at the initial display stage during which a large amount of shape data is transmitted.

The process according to the second embodiment will be now described. The overall process flow of the second embodiment is identical with that of the first embodiment shown in FIG. 8, except for the server-side cache process (Step S24) and the client-side cache process (Step S13).

The server-side cache process according to the second embodiment will be described first with reference to the flowchart of FIG. 19.

Figure 19:
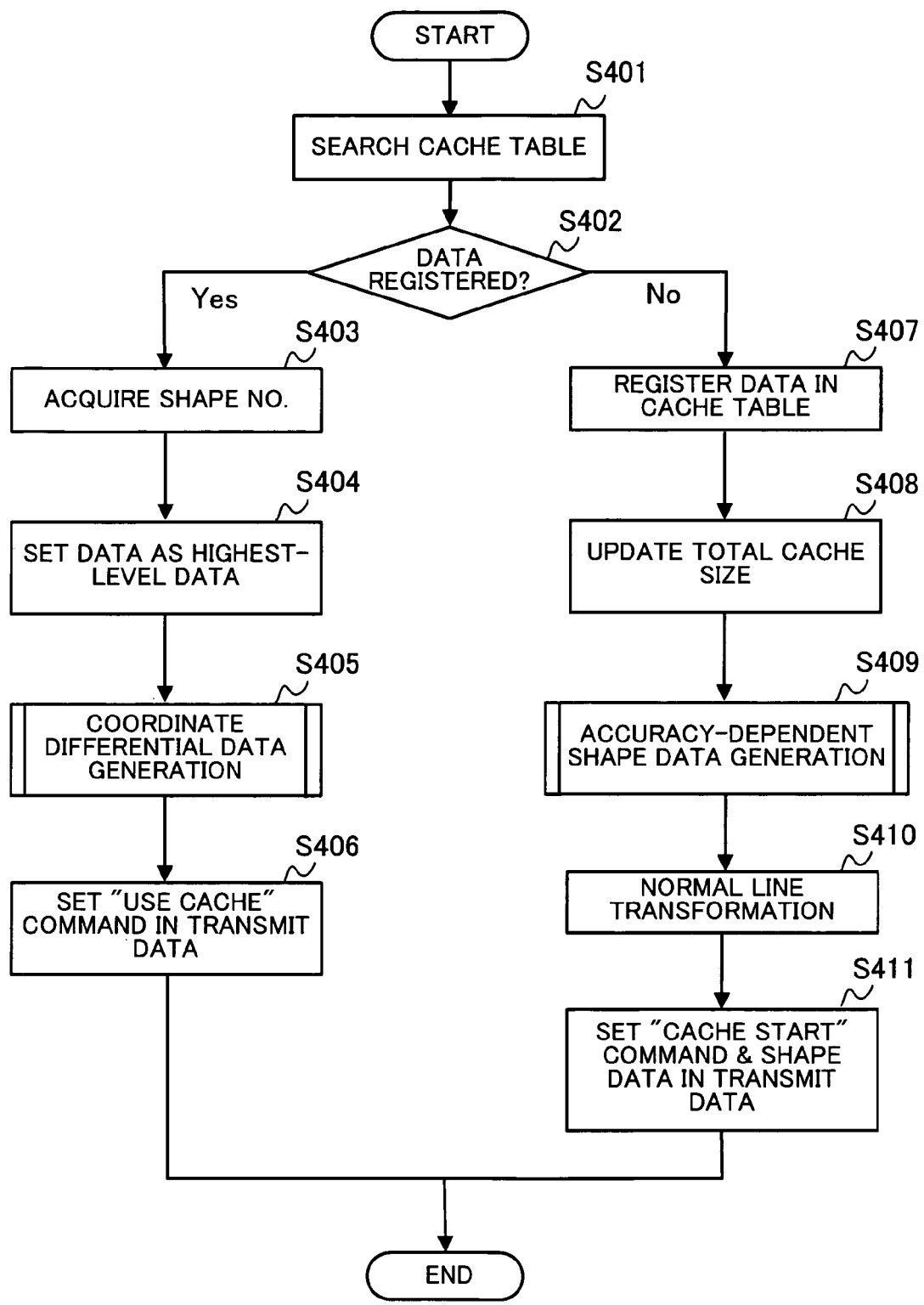
FIG. 19 is a flowchart illustrating a server-side cache process according to the second embodiment.

The process shown in FIG. 19 differs from the server-side cache process of the first embodiment shown in FIG. 9 in that it additionally includes a coordinate differential data generation process (Step S405), an accuracy-dependent shape data generation process (Step S409) and a normal line transformation process (Step S410).

Specifically, with respect to current shape data of the graphics information, a search is performed to determine whether or not shape data identical with the current data exists in the cache table (Step S401). If the identical shape data is found, the process proceeds to Step S403; if not, the process proceeds to Step S407 (Step S402).

If the identical shape data is found, that is, if the corresponding shape cache data is already registered, the shape number of the corresponding shape cache data is acquired (Step S403), and the corresponding shape cache data is set as the highest-level data in the cache table (Step S404). Subsequently, the coordinate accuracy determination is made, and if necessary, coordinate differential data is generated and set in the transmit data (Step S405). Details of this process will be described later. Then, the shape number acquired in Step S403 is set as an argument, and the "USE CACHE" command and the transmit data (coordinate differential data), if generated in Step S405, are set in the transmitting buffer (Step S406), whereupon the process ends.

On the other hand, if the identical shape data is not found, that is, if no corresponding shape cache data is registered, the shape data is assigned a unique shape number and is registered, together with the shape number, as the highest-level data in the cache table (Step S407). Also, the size of the currently set shape data is added to the total cache size 401, thereby updating the total cache size 401 (Step S408). Subsequently, the coordinate accuracy determination is made, and, if possible in view of the calculated accuracy, some coordinates are replaced by approximate values to reduce the shape data amount, the resultant data being set in the transmit data (Step S409). At this time, the accuracy information such as the calculated ow/vw is registered as the accuracy information 413 in the shape cache data, and the transmission information 741, which indicates transmission/non-transmission of the coordinates etc., is also set. Further, the normal line data of the shape data is transformed from the x-y-z coordinate format to the format using θ1 and θ2, and the data obtained is set in the transmit data (Step S410). Then, the assigned shape number is set as an argument, and the "CACHE START" command and the transmit data generated in Steps S409 and S410 are set in the transmitting buffer (Step S411), whereupon the process ends.

The following describes the coordinate differential data generation process (Step S405) and the accuracy-dependent shape data generation process (Step S409).

Figure 20:
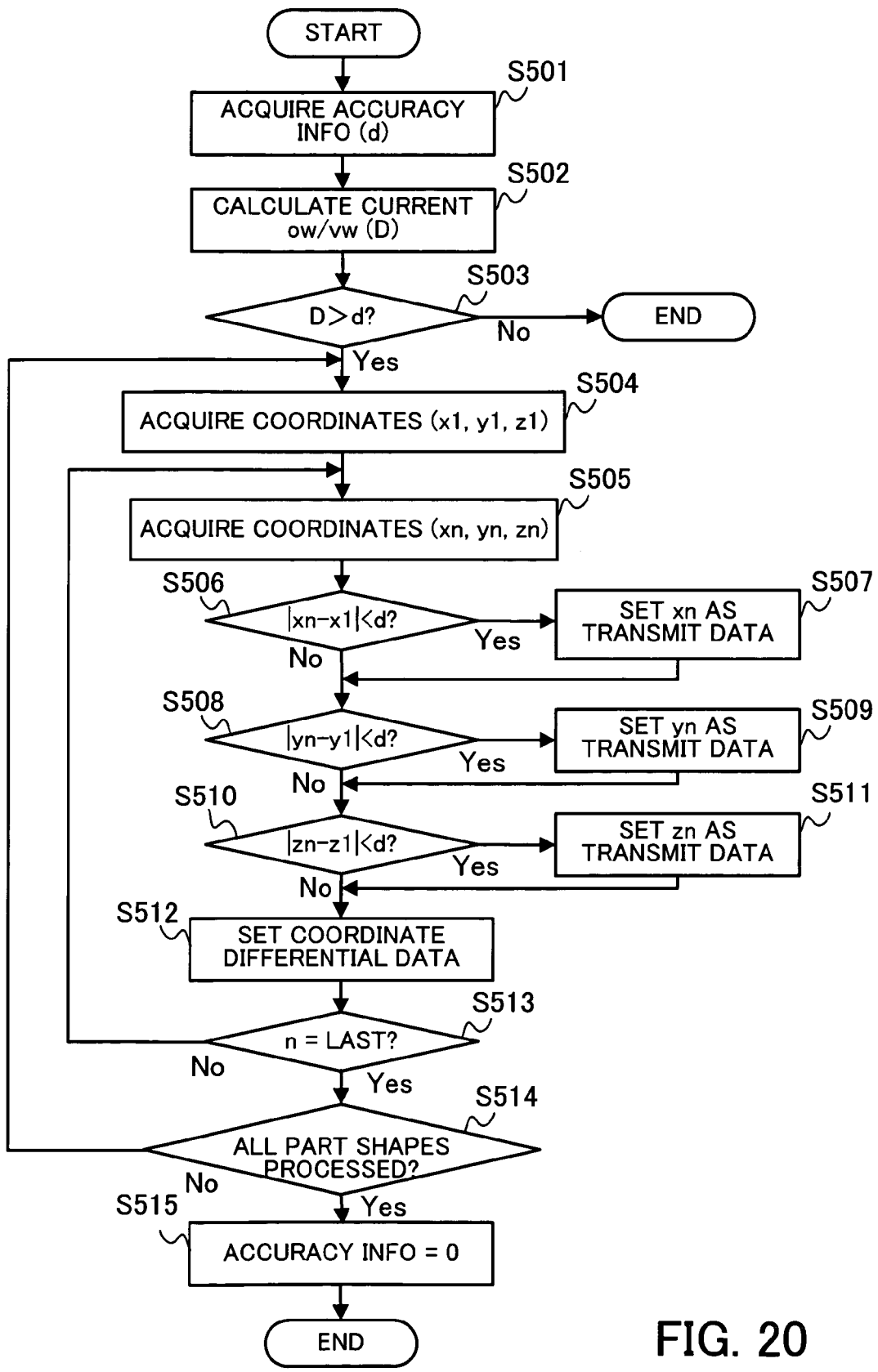
FIG. 20 is a flowchart illustrating a coordinate differential data generation process executed by a server according to the second embodiment.

FIG. 20 is a flowchart illustrating the coordinate differential data generation process executed by the server according to the second embodiment.

The coordinate differential data generation process is started after the shape cache table associated with a certain shape and the currently generated graphics information are specified.

Step S501: The accuracy information is acquired from the specified shape cache data. In the following, the acquired accuracy information (ow/vw) is referred to as d, which is the ow/vw value of the previously transmitted coordinate data.

Step S502: Based on the specified graphics information, a current ow/vw value, D, is obtained.

Step S503: The value d acquired in Step S501 and the value D calculated in Step S502 are compared with each other to determine whether or not higher accuracy is required. If D≦d, that is, if the accuracy of the already transmitted coordinate data is higher than or equal to that currently required, no coordinate differential data is necessary, and accordingly, the process ends. On the other hand, if D>d, that is, if the currently required accuracy is higher than that of the already transmitted coordinate data, the following steps are executed.

Step S504: The coordinates (x1, y1, z1) of the first point of a part shape are acquired from the shape cache data. When shape data is transmitted, the coordinates of the first point of the shape are always transmitted and are used as criteria for determining whether to transmit the other coordinates. Accordingly, the coordinates of the first point are acquired and the determination is made in like manner.

Step S505: The coordinates (xn, yn, zn) of an n-th point of the part shape are acquired from the shape cache data, where the n-th point denotes a desired point stored in the shape cache data, except the first point.

Step S506: The value xn acquired in Step S505 and the reference value x1 acquired in Step S504 are compared with each other to determine whether or not the difference between the two is within the range of the accuracy d. If the difference is outside the range, it is judged that xn has already been transmitted and thus need not be transmitted, and the process proceeds to Step S508.

Step S507: The difference between xn and x1 is within the range, and therefore, it is judged that xn is not transmitted yet and should be transmitted.

Step S508: The value yn acquired in Step S505 and the reference value y1 acquired in Step S504 are compared with each other to determine whether or not the difference between the two is within the range of the accuracy d. If the difference is outside the range, it is judged that yn has already been transmitted and thus need not be transmitted, and the process proceeds to Step S510.

Step S509: The difference between yn and y1 is within the range, and therefore, it is judged that yn is not transmitted yet and should be transmitted.

Step S510: The value zn acquired in Step S505 and the reference value z1 acquired in Step S504 are compared with each other to determine whether or not the difference between the two is within the range of the accuracy d. If the difference is outside the range, it is judged that zn has already been transmitted and thus need not be transmitted, and the process proceeds to Step S512.

Step S511: The difference between zn and z1 is within the range, and therefore, it is judged that zn is not transmitted yet and should be transmitted.

Step S512: The coordinates to be transmitted, among (xn, yn, zn), have been determined in Steps S506 through S511, and accordingly, the differential data designation information and the coordinate data to be transmitted are set as the coordinate differential data, as shown in FIG. 17.

Step S513: It is determined whether or not the n-th point is the last point of the part shape defined between glBegin and glEnd. If the n-th point is not the last point, n is incremented by "1" and Step S505 and the following steps are repeated.

Step S514: One part shape has been processed, and it is therefore determined whether or not all part shapes of the shape cache data have been processed. If all part shapes have not yet been processed, the process returns to Step S504 to repeatedly execute the following steps with respect to the next part shape.

Step S515: As a result of the execution of the preceding steps, all the necessary coordinate data has been transmitted, and therefore, the accuracy information 413 is initialized (=0), whereupon the process ends.

In the aforementioned process, whether coordinate data has already been transmitted or not is determined in Steps S506 through S511. Alternatively, the transmission information 741 shown in FIG. 17 may be looked up so that the untransmitted coordinates may be transmitted.

Also, in the above process, when it is judged that the coordinate differential data is required, all of the omitted coordinate data is transmitted. Depending on the required accuracy, however, it may be unnecessary to transmit all coordinate data. Thus, to lessen the amount of data transmitted at a time, the determination as to transmission of data may be made by using also the currently calculated accuracy D. Specifically, the condition used in the decision of Step S506 is changed to D<|xn−x1|<d, and the conditions used in the decisions of Steps S508 and S510 are changed in like manner. Also, in this case, the accuracy information 413 is not initialized in Step S515, and D is set for the accuracy information 413 instead. Thus, in cases where high-accuracy original coordinate data need not be transmitted though the already transmitted coordinate data is approximate data and thus low in accuracy, the unnecessary data is omitted from the transmit data, thereby reducing the data amount.

The shape data generation process (Step S409) will be now described.

Figure 21:
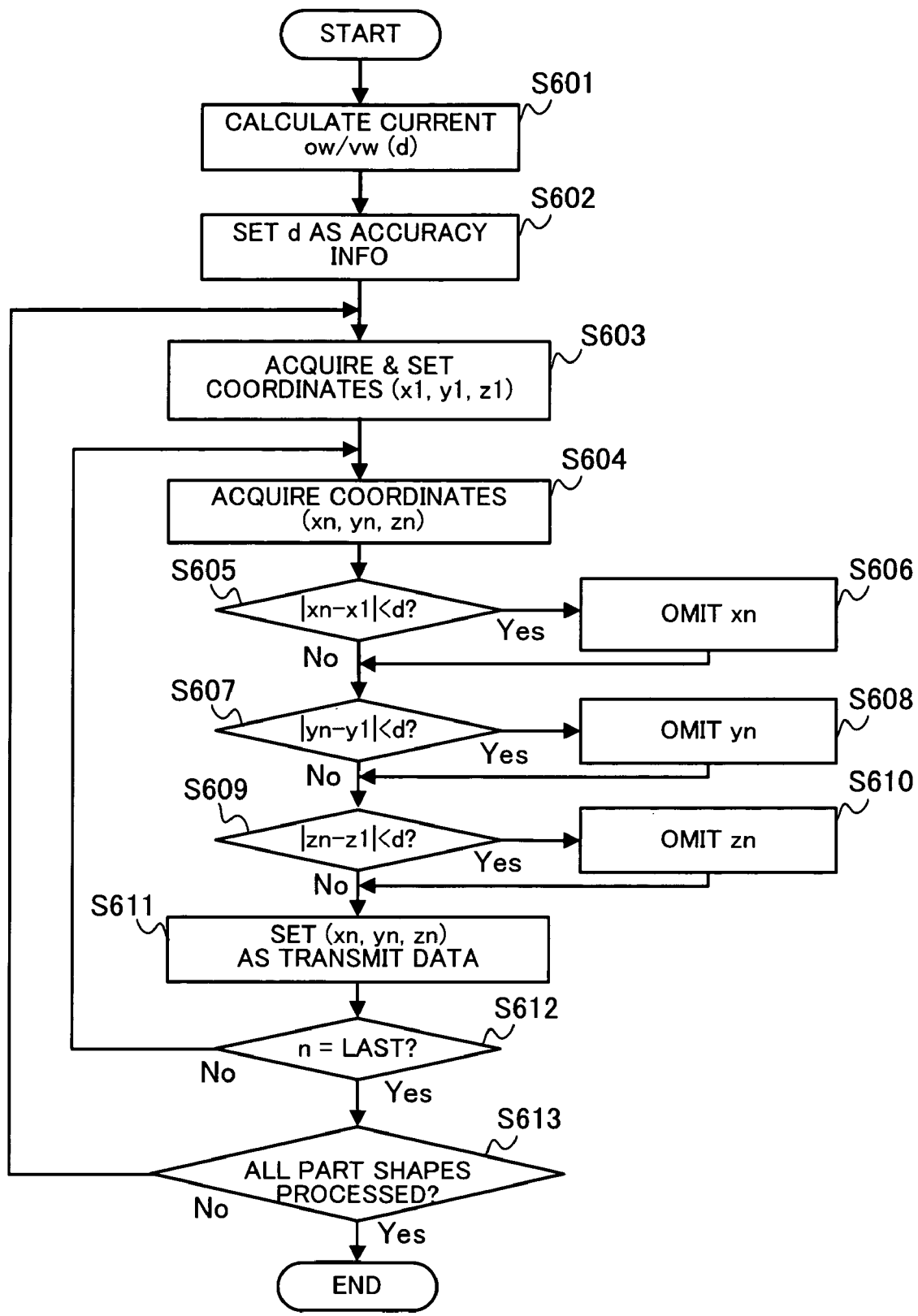
FIG. 21 is a flowchart illustrating a shape data generation process according to the second embodiment.

FIG. 21 is a flowchart illustrating the shape data generation process according to the second embodiment. The process is started when certain shape data of the graphics information has been newly registered as shape cache data.

Step S601: The current value ow/vw set in the shape cache data is calculated as d.

Step S602: The value d calculated in Step S601 is set as the accuracy information 413 of the shape cache data. The set value is used in the coordinate differential data generation process shown in FIG. 20.

Step S603: The coordinates (x1, y1, z1) of the first point of a part shape are acquired from the shape cache data and set as transmit data. The coordinates of the first point of a shape are always transmitted and are used as criteria for determining whether to transmit the other coordinates.

Step S604: The coordinates (xn, yn, zn) of an n-th point of the part shape are acquired from the shape cache data, where the n-th point denotes a desired point stored in the shape cache data, except the first point.

Step S605: The value xn acquired in Step S604 and the reference value x1 acquired in Step S603 are compared with each other to determine whether or not the difference between the two is within the range of the accuracy d. If the difference is outside the range, it is judged that xn should be transmitted, and the process proceeds to Step S607.

Step S606: The difference between xn and x1 is within the range, and therefore, it is judged that xn can be approximated using x1 and thus be omitted.

Step S607: The value yn acquired in Step S604 and the reference value y1 acquired in Step S605 are compared with each other to determine whether or not the difference between the two is within the range of the accuracy d. If the difference is outside the range, it is judged that yn should be transmitted, and the process proceeds to Step S609.

Step S608: The difference between yn and y1 is within the range, and therefore, it is judged that yn can be approximated using y1 and thus be omitted.

Step S609: The value zn acquired in Step S604 and the reference value z1 acquired in Step S605 are compared with each other to determine whether or not the difference between the two is within the range of the accuracy d. If the difference is outside the range, it is judged that zn should be transmitted, and the process proceeds to Step S611.

Step S610: The difference between zn and z1 is within the range, and therefore, it is judged that zn can be approximated using z1 and thus be omitted.

Step S611: The coordinates to be omitted, among (xn, yn, zn), have been determined in Steps S605 through S610, and accordingly, the coordinate data from which the data to be omitted has been deleted, as shown in FIGS. 14 and 15, is set as the transmit data.

Step S612: It is determined whether or not the n-th point is the last point of the part shape defined between glBegin and glEnd. If the n-th point is not the last point, n is incremented by "1" and Step S604 and the following steps are repeated.

Step S613: One part shape has been processed, and it is therefore determined whether or not all part shapes of the shape cache data have been processed. If all part shapes have not yet been processed, the process returns to Step S603 to repeatedly execute the following steps with respect to the next part shape.

As the aforementioned process is executed, the server replaces some omissible coordinates with respective approximate values in accordance with the accuracy required for the display, thereby reducing the transmit data amount. When the need for higher accuracy arises thereafter, the omitted coordinate data is transmitted as the differential information.

The client-side cache process according to the second embodiment will be now described with reference to the flowchart of FIG. 22.

Figure 22:
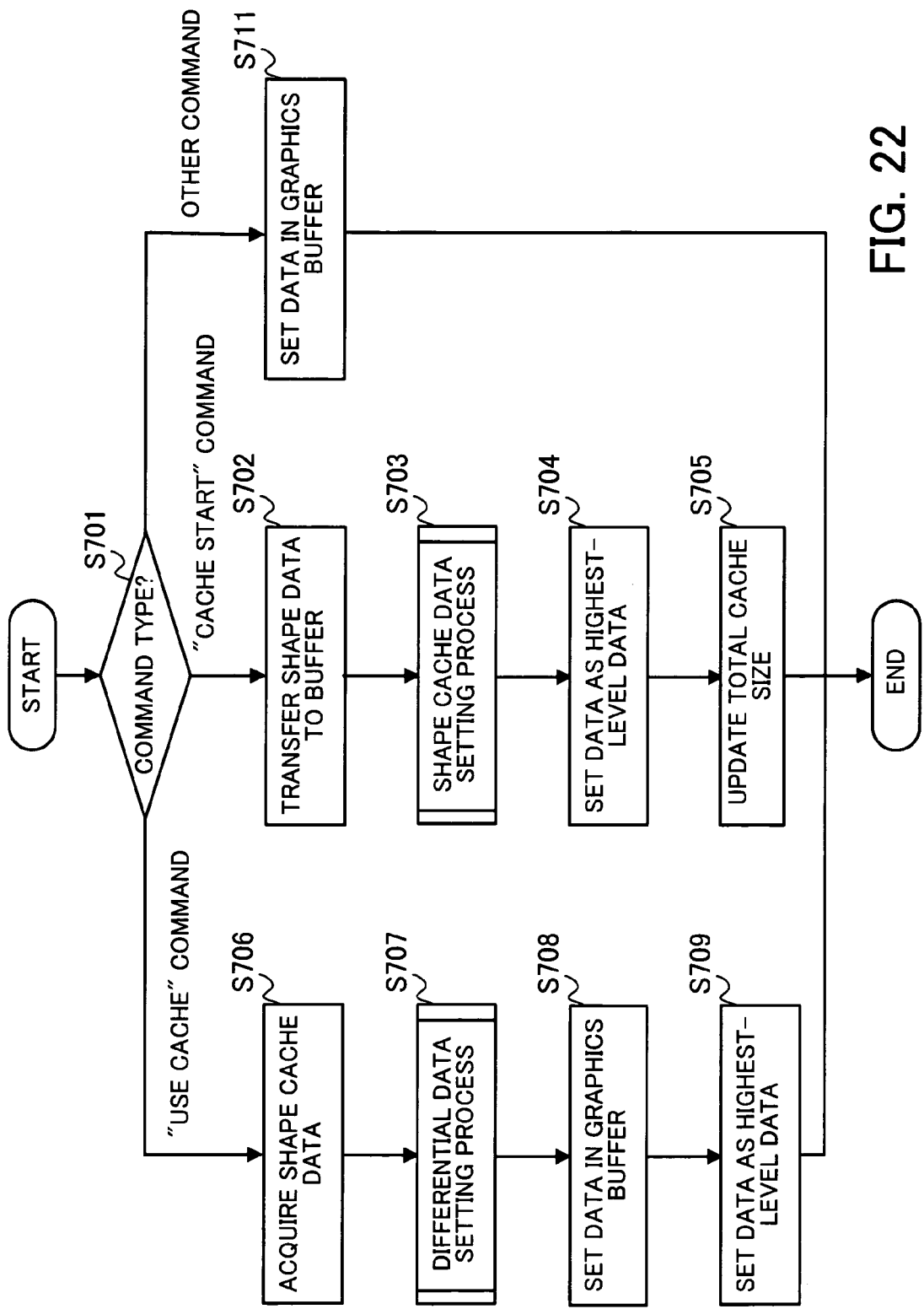
FIG. 22 is a flowchart illustrating a client-side cache process according to the second embodiment.

Compared with the client-side cache process of the first embodiment shown in FIG. 10, the process shown in FIG. 22 additionally includes a shape cache data setting process (Step S703) and a coordinate differential data setting process (Step S707).

Specifically, the graphics differential information is checked to identify the command set in each given area thereof. If the command is the "USE CACHE" command, the process proceeds to Step S706; if the command is the "CACHE START" command, the process proceeds to Step S702; and if the command is some other command or no command is set, the process proceeds to Step S711 (Step S701).

Where the set command is the "CACHE START" command, the whole shape data succeeding the command is transferred to the graphics buffer (Step S702). Then, based on the received data from which part of the coordinate data has been omitted and which includes the transformed normal line data, the shape data is restored and set as shape cache data (Step S703). Details of this process will be explained later. Subsequently, the related information is rewritten so that the shape cache data set in Step S703 may be the highest-level data in the cache table (Step S704). The size of the currently acquired shape data is added to the total cache size 401 to thereby update the total cache size 401 (Step S705), whereupon the process ends.

Where the set command is the "USE CACHE" command, the shape number set as the argument of the command is looked up and the client-side cache table is searched to extract the registered shape cache data with the corresponding shape number (Step S706). Then, the coordinate differential data setting process is performed to update the shape cache data by using the received coordinate differential data (Step S707). Details of this process will be explained later. Subsequently, the updated shape cache data is set in the graphics buffer (Step S708), and the related information is rewritten so that the updated shape cache data may be the highest-level data in the cache table (Step S709).

Where the set command is some other command, the data should be classified as data different from shape data, and therefore, the data is directly set in the graphics buffer (Step S711).

In the following, the shape cache data setting process (Step S703) and the coordinate differential data setting process (Step S707) will be explained.

Figure 23:
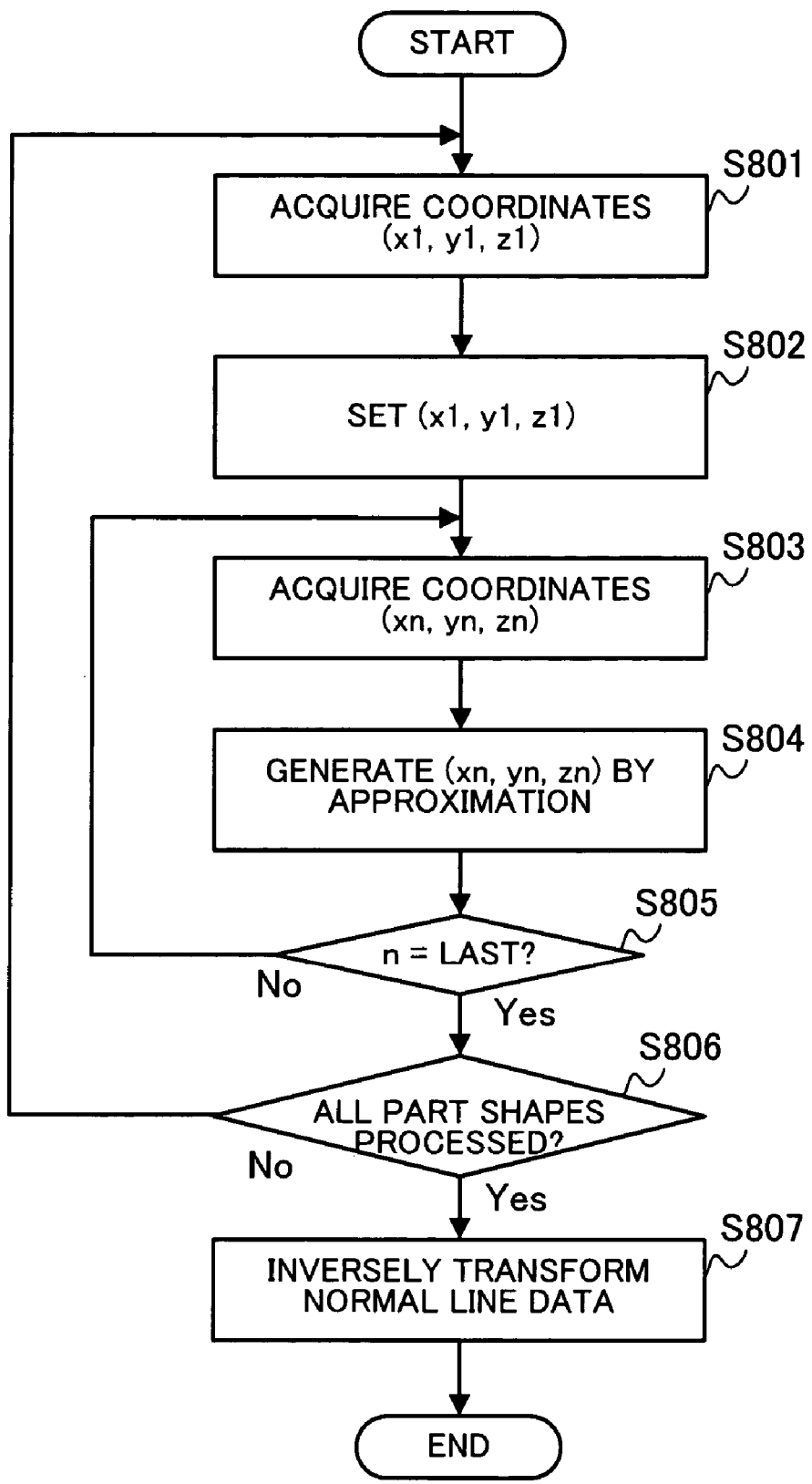
FIG. 23 is a flowchart illustrating a shape cache data setting process according to the second embodiment.

FIG. 23 is a flowchart illustrating the shape cache data setting process according to the second embodiment. The process is started in response to the "CACHE START" command.

Step S801: The coordinates (x1, y1, z1) of the first point of a part shape are acquired from the shape data set in the graphics buffer. The coordinates of the first point of a shape are always transmitted to be used as approximate values of the omitted coordinates.

Step S802: The coordinates (x1, y1, z1) of the first point, acquired in Step S801, are set as shape cache data.

Step S803: The coordinates (xn, yn, zn) of an n-th point of the part shape are acquired from the graphics buffer, where the n-th point denotes a desired point stored in the graphics buffer, except the first point.

Step S804: The format of the coordinates (xn, yn, zn) of the n-th point is checked to determine whether the format used is an ordinary coordinate data format or an omitted data format in which some coordinates are omitted, as shown in FIGS. 14 and 15. If the omitted data format is used, the omitted coordinates are approximated by using the corresponding ones of the coordinates (x1, y1, z1) of the first point, acquired in Step S802. Specifically, if xn is omitted, x1 is used as an approximate value of xn. Similarly, yn and zn are approximated using y1 and z1, respectively.

Step S805: It is determined whether or not the n-th point is the last point of the part shape defined between glBegin and glEnd. If the n-th point is not the last point, n is incremented by "1" and Step S803 and the following steps are repeated.

Step S806: One part shape has been processed, and it is therefore determined whether or not all part shapes of the shape data have been processed. If all part shapes have not yet been processed, the process returns to Step S801 to repeatedly execute the following steps with respect to the next part shape.

Step S807: The normal line data, which is in the format using $\theta 1$ and $\theta 2$, is inversely transformed into the (x, y, z) format and the resultant data is set in the shape cache data, whereupon the process ends.

Figure 24:
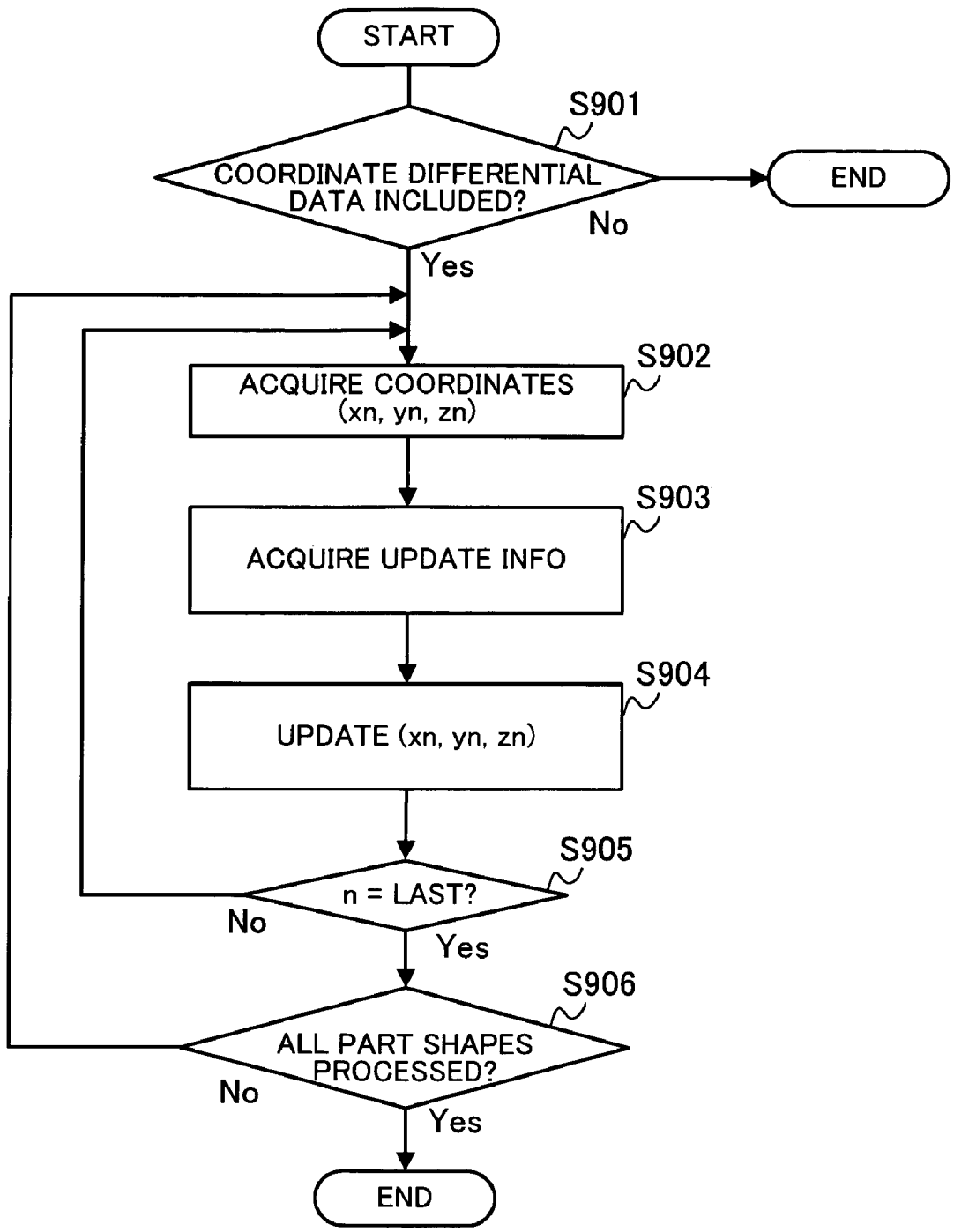
FIG. 24 is a flowchart illustrating a coordinate differential data setting process according to the second embodiment.

FIG. 24 is a flowchart illustrating the coordinate differential data setting process according to the second embodiment. The process is started in response to the "USE CACHE" command.

Step S901: It is determined whether the transmit data received from the server is in the data format 500b including no coordinate differential data as shown in FIG. 7, or the data format 500c including coordinate differential data as shown in FIG. 13. If no coordinate differential data is included, the process ends because it is unnecessary to perform the process.

Step S902: Where coordinate differential data is included, the coordinates (xn, yn, zn) of the n-th point specified by the coordinate differential data are acquired from the shape cache data.

Step S903: Update information for updating (xn, yn, zn) is acquired from the coordinate differential data.

Step S904: Using the update information acquired in Step S903, corresponding ones of the coordinates (xn, yn, zn) of the n-th point are updated to the received coordinates, and the updated data is set in the shape cache data.

Step S905: It is determined whether or not the n-th point is the last point of the part shape. If the n-th point is not the last point, n is incremented by "1" and Step S902 and the following steps are repeated.

Step S906: One part shape has been processed, and it is therefore determined whether or not all part shapes of the differential data have been processed. If all part shapes have not yet been processed, the process returns to Step S902 to repeatedly execute the following steps with respect to the next part shape.

As the aforementioned processes of the second embodiment are executed, the amount of data transmitted at a time can be reduced to a smaller amount than in the case of the first embodiment.

The processing functions described above can be performed by a server computer and a client computer. In this case, a data transfer server program (server program) is prepared in which is described the process for performing the data transfer function of the server, and also a data reception program (client program) is prepared in which is described the process for performing the data reception function of the client. The server program is executed by the server computer, whereupon the function of transferring differential data of graphic commands created by a 3D application and registering/managing cache data is accomplished by the server computer. Also, the client program is executed by the client computer, whereupon the function of restoring the graphic commands and registering/managing the cache data is accomplished by the client computer.

The server program and the client program describing the respective required processes may be recorded on a computer-readable recording medium. The computer-readable recording medium includes a magnetic recording device, an optical disc, a magneto-optical recording medium, a semiconductor memory, etc. The magnetic recording device may be a hard disk drive (HDD), a flexible disk (FD), a magnetic tape or the like. As the optical disc, a DVD (Digital Versatile Disc), a DVD-RAM (Random Access Memory), a CD-ROM (Compact Disc Read Only Memory), a CD-R (Recordable)/RW (ReWritable) or the like may be used. The magneto-optical recording medium includes an MO (Magneto-Optical disc) etc.

To market the server program and the client program, portable recording media, such as DVDs and CD-ROMs, on which the individual programs are recorded may be put on sale. Alternatively, the client program may be stored in the storage device of the server computer and may be transferred from the server computer to client computers via a network.

The server computer which is to execute the server program stores in its storage device the server program recorded on a portable recording medium, for example. Then, the server computer loads the server program from its storage device and performs processing in accordance with the server program. The server computer may load the server program directly from the portable recording medium to perform the process in accordance with the server program.

The client computer which is to execute the client program stores in its storage device the client program recorded on a portable recording medium or transferred from the server computer, for example. Then, the client computer loads the client program from its storage device and performs processing in accordance with the client program. The client computer may load the client program directly from the portable recording medium to perform the process in accordance with the client program. Also, as the client program is transferred from the server computer, the client computer may sequentially execute the process in accordance with the received client program.

According to the present invention, shape data is registered in the shape cache information of both the server and the client, and when transmitting graphics information to the client, the server transmits designation information specifying the corresponding shape data registered in the shape cache information, instead of transmitting the registered shape data itself. This allows only new shape data to be set in the graphics differential information to be transferred, thereby cutting down the data transfer amount. Also, by transmitting graphic commands as the graphics information, it is possible to reduce the load on the server associated with image processing. Consequently, existing 3D applications handling three-dimensional shapes can be run in the form of ASP as applications having three-dimensional display performance suited to the operation of ASP, without the need to modify the existing 3D applications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transfer system comprising:
   (a) an application server computer comprising:
   a server-side cache memory for storing shape cache information in which is registered shape data used for drawing a predetermined shape;
   search/registration means, responsive to creation of graphics information by an application, for searching the server-side cache memory to determine whether or not shape data of the created graphics information is registered in the shape cache information, and registering the shape data in the shape cache information in the server-side cache memory if the shape data is not registered; and
   data transfer means for replacing, if the shape data is registered, the shape data of the graphics information with designation information specifying corresponding registered shape data registered in the shape cache information to generate graphics differential information, and transmitting the generated graphics differential information; and (b) a client computer comprising:
    a client-side cache memory for storing the shape cache information in which the shape data is registered;
    registration means, responsive to acquisition of the graphics differential information from the application server computer, for registering new shape data of the graphics differential information in the shape cache information in the client-side caches memory; and
    data restoration means for searching the shape cache information in the client-side cache memory based on the designation information of the graphics differential information, and replacing the designation information of the graphics differential information with registered shape data found by the search, to restore the graphics information, wherein:
    the search/registration means and the registration means assign a unique shape number to the shape data when registering the shape data; and
    the data transfer means sets, as the designation information, the unique shape number assigned to the registered shape data.

2. The data transfer system according to claim 1, wherein the shape data comprises a group of graphic commands which is created by a three-dimensional application for processing a three-dimensional image and which is capable of drawing a shape of the three-dimensional image.

3. The data transfer system according to claim 2, wherein the search/registration means of the application server computer detects a start command and end command of graphic commands defining a shape included in the graphics information, and extracts the commands as the group of graphic commands for drawing the shape of the three-dimensional image.

4. The data transfer system according to claim 1, wherein, when transmitting new shape data newly registered in the shape cache information, the data transfer means transmits the new shape data to the client computer while adding a shape data registration instruction and information specifying the unique shape number to the graphics differential information, and
    the registration means of the client computer registers the new shape data with the unique shape number assigned thereto, in accordance with the shape data registration instruction.

5. The data transfer system according to claim 1, wherein, each time the shape data in the graphics information is detected, the search/registration means of the application server computer sets the corresponding registered shape data as highest-level shape data in the shape cache information in the server-side cache memory, and
    each time the shape data in the graphics differential information or the shape data specified by the designation information is detected, the registration means of the client computer sets the corresponding registered shape data as highest-level shape data in the shape cache information in the client-side cache memory,
    whereby the shape data is arranged in the shape cache information in order of setting such that the latest set shape data is the highest-level shape data.

6. The data transfer system according to claim 1, wherein each of the application server computer and the client computer further includes cache management means for determining whether or not a total data size of the shape data registered in the corresponding shape cache information is greater than a predetermined total cache size and, if the predetermined total cache size is exceeded, deleting the shape data registered in the shape cache information until the total data size becomes smaller than a post-deletion specified value.

7. The data transfer system according to claim 6, wherein, each time the shape data in the graphics information is detected, the search/registration means of the application server computer sets the corresponding registered shape data as highest-level shape data in the shape cache information in the server-side cache memory, and each time the shape data in the graphics differential information or the shape data specified by the designation information is detected, the registration means of the client computer sets the corresponding registered shape data as highest-level shape data in the shape cache information in the client-side cache memory, whereby the shape data is arranged in the shape cache information in order of selling such that the latest set shape data is the highest-level shape data, and
    the cache management means deletes the shape data in order from the one which is set in the shape cache information as lowest-level shape data.

8. The data transfer system according to claim 1, wherein, when the shape data is registered in the shape cache information in the server-side cache memory by the search/registration means, the data transfer means of the application server computer calculates, based on the shape data, coordinate accuracy required for display at the client computer, and transmits, to the client computer, the shape data of which part of coordinate data is omitted in accordance with the calculated coordinate accuracy, and approximation designation information specifying reference coordinates as approximate values of the omitted coordinate data, and
    the registration means of the client computer approximates the omitted coordinate data of the acquired shape data by using the reference coordinates specified by the approximation designation information, and registers, in the shape cache information in the client-side cache memory, the shape data including the approximated coordinate data.

9. The data transfer system according to claim 8, wherein, if higher coordinate accuracy is required due to change in display condition for the shape data which has already been transmitted to the client computer with part of the coordinate data omitted, the data transfer means of the application server computer transmits, to the client computer, coordinate differential data including necessary coordinate data, among the coordinate data which is not yet transmitted to the client computer, and designation information specifying the necessary coordinate data, and
    the registration means of the client computer updates, based on the coordinate differential data, the corresponding coordinate data stored in the shape cache information in the client-side cache memory.

10. The data transfer system according to claim 8, wherein the data transfer means of the application server computer and the registration means of the client computer use, as the reference coordinates, coordinates of a first point of the coordinate data set with respect to each part shape of the shape data.

11. The data transfer system according to claim 8, wherein the data transfer means of the application server computer derives the coordinate accuracy in accordance with a ratio of a width or height of a view volume related with a shape of the shape data to a width or height of a viewport.

12. The data transfer system according to claim 1, wherein the data transfer means of the application server computer transforms normal line values represented by a three-dimensional vector into a format represented by arc tangents of the vector, and the registration means of the client computer inversely transforms the transformed normal line values into the three-dimensional vector format, and registers the restored normal line values in the shape cache information in the client-side cache memory.

13. A data transfer method comprising the steps of:

causing search/registration means of an application server computer to perform a search in response to creation of graphics information by an application to determine whether or not shape data of the created graphics information used for drawing a predetermined shape is registered in shape cache information stored in a server-side cache memory, and register the shape data assigned a unique shape number in the shape cache information in the serve-side cache memory if the shape data is not registered;

causing data transfer means of the application server computer to replace, if the shape data is registered, the shape data of the graphics information with the unique shape number assigned to the registered shape data as designation information specifying corresponding registered shape data registered in the shape cache information to generate graphics differential information, and transmit the generated graphics differential information over a network;

causing registration means of a client computer to register, on acquisition of the graphics differential information, new shape data of the graphics differential information in the shape cache information with a unique shape number assigned to the new shape data, and store the shape cache information in a client-side cache memory; and causing data restoration means of the client computer to search the shape cache information in the client-side cache memory based on the designation information of the graphics differential information, and replace the designation information of the graphics differential information with registered shape data found by the search, to restore the graphics information.

14. A computer-readable recording medium recording a data transfer server program, wherein the data transfer server program causes a computer to execute the steps of:

causing search/registration means to perform a search in response to creation of graphics information by an application to determine whether or not shape data of the created graphics information used for drawing a predetermined shape is registered in shape cache information stored in a server-side cache memory, and register the shape data assigned a unique shape number in the shape cache information in the server-side cache memory if the shape data is not registered; and causing data transfer means to replace, if the shape data is registered, the shape data of the graphics information with the unique shape number assigned to the registered shape data as designation information specifying corresponding registered shape data registered in the shape cache information to generate graphics differential information, and transmit the generated graphics differential information to the client computer which is adapted to store the shape cache information in a client-side cache memory, search the client-side cache memory based on the designation information of the graphics differential information, and replace the designation information with registered shape data found by the search, to restore the graphics information.

* * * * *

UNITED STATES PATENT AND TRADEMARK OFFICE
CERTIFICATE OF CORRECTION

| | | |
|---|---|---|
| PATENT NO. | : 7,478,098 B2 | Page 1 of 1 |
| APPLICATION NO. | : 11/386426 | |
| DATED | : January 13, 2009 | |
| INVENTOR(S) | : Suzuki | |

It is certified that error appears in the above-identified patent and that said Letters Patent is hereby corrected as shown below:

Claim 1, Col. 27, line 8   Please delete "caches" and insert --cache-- in its place.

Claim 7, Col. 28, line 16  Please delete "selling" and insert --setting-- in its place.

Signed and Sealed this

Twelfth Day of May, 2009

JOHN DOLL
*Acting Director of the United States Patent and Trademark Office*